US008577817B1

(12) United States Patent
Keralapura et al.

(10) Patent No.: US 8,577,817 B1
(45) Date of Patent: Nov. 5, 2013

(54) SYSTEM AND METHOD FOR USING NETWORK APPLICATION SIGNATURES BASED ON TERM TRANSITION STATE MACHINE

(75) Inventors: Ram Keralapura, San Jose, CA (US); Antonio Nucci, San Jose, CA (US); Alok Tongaonkar, Sunnyvale, CA (US)

(73) Assignee: Narus, Inc., Sunnyvale, CA (US)

( * ) Notice: Subject to any disclaimer, the term of this patent is extended or adjusted under 35 U.S.C. 154(b) by 362 days.

(21) Appl. No.: 13/039,180

(22) Filed: Mar. 2, 2011

(51) Int. Cl.
*G06N 5/02* (2006.01)

(52) U.S. Cl.
USPC .................................. 706/13; 370/235

(58) Field of Classification Search
None
See application file for complete search history.

(56) References Cited

U.S. PATENT DOCUMENTS

| | | | |
|---|---|---|---|
| 6,412,000 B1* | 6/2002 | Riddle et al. | 709/224 |
| 6,457,051 B1* | 9/2002 | Riddle et al. | 709/224 |
| 7,308,715 B2* | 12/2007 | Gupta et al. | 726/23 |
| 7,444,515 B2* | 10/2008 | Dharmapurikar et al. | 713/176 |
| 7,584,507 B1* | 9/2009 | Nucci | 726/23 |
| 7,644,150 B1* | 1/2010 | Nucci et al. | 709/223 |
| 7,689,530 B1* | 3/2010 | Williams et al. | 706/62 |
| 7,712,134 B1* | 5/2010 | Nucci et al. | 726/23 |
| 7,944,822 B1* | 5/2011 | Nucci et al. | 370/229 |
| 8,180,916 B1* | 5/2012 | Nucci et al. | 709/233 |
| 8,239,687 B2* | 8/2012 | Stolfo | 713/188 |
| 8,407,794 B2* | 3/2013 | Kim et al. | 726/24 |
| 2003/0108042 A1* | 6/2003 | Skillicorn et al. | 370/389 |
| 2005/0111460 A1* | 5/2005 | Sahita | 370/395.3 |
| 2007/0171827 A1* | 7/2007 | Scott et al. | 370/235 |
| 2007/0300301 A1* | 12/2007 | Cangini et al. | 726/23 |
| 2008/0178293 A1* | 7/2008 | Keen et al. | 726/23 |
| 2009/0106183 A1* | 4/2009 | Estan et al. | 706/48 |
| 2009/0141634 A1* | 6/2009 | Rothstein et al. | 370/236 |
| 2011/0149793 A1* | 6/2011 | Kim et al. | 370/253 |

OTHER PUBLICATIONS

Ilgun K. et al., "State Transition Analysis: A Rule-Based Intrusion Detection Approach", IEEE Transactions on Software Engineering, vol. 21, No. 3, Mar. 1995, pp. 181-199.*
Williams N. et al., "Evaluating Machine Learning Algorithms for Automated Network Application Identification", CAIA Technical Report, Mar. 2006, pp. 1-14.*
Callado A. et al., "A Survey on Internet Traffic Identification", IEEE Communications Surveys & Tutorials, vol. 11, No. 3, Third Quarter 2009, pp. 37-52.*
Alicherry M. et al., "High Speed Pattern Matching for Network IDS/IPS", IEEE ICNP '06, 2006, pp. 187-196.*

(Continued)

*Primary Examiner* — Jeffrey A Gaffin
*Assistant Examiner* — Dave Misir
(74) *Attorney, Agent, or Firm* — Fernandez & Associates, LLP

(57) ABSTRACT

A method for profiling network traffic of a network. The method includes identifying a training set having captured payloads corresponding to a set of flows associated with a network application, determining a set of signature terms from the training set, representing a portion of the captured payloads as regular expressions, representing a regular expression as a path in a term transition state machine (TTSM) including states coupled by at least a link that is assigned a signature term and a transition probability, the transition probability corresponding to a signature term transition to the signature term in the regular expression, and analyzing, based on the TTSM according to at least the transition probability, a flow separate from the set of flows and associated with a server in the network to determine the server as executing the network application.

33 Claims, 6 Drawing Sheets

(56) References Cited

OTHER PUBLICATIONS

Dharmapurikar S. et al., "Fast and Scalable Pattern Matching for Network Intrusion Detection Systems", IEEE Journal on Selected Areas in Communications, vol. 24, No. 10, Oct. 2006, pp. 1781-1792.*

Carrasco, Rafael C., et al., "Learning Stochastic Regular Grammars by Means of a State Merging Method", Proceedings of the Second International Colloquium. Sep. 21-23. ICG, Alicante, pp. 139-152, Springer-Verlag.

Rulot, H., et al., "Learning accurate finite-state structural models of words through the ECGI algorithm", International Conference on Acoustics, Speech, and Signal Processing, 1989, ICASSP-89., May 23-26, 1989, pp. 643-646, Glasgow, UK.

Thollard, Franck, et al., "Probabilistic DFA Inference using Kullback-Leibler Divergence and Minimality", Proc 17th International Conf on Machine Learning (2000), pp. 975-982, Morgan Kaufmann, San Francisco, CA.

* cited by examiner

SYSTEM AND METHOD FOR USING NETWORK APPLICATION SIGNATURES BASED ON TERM TRANSITION STATE MACHINE

CROSS REFERENCE TO RELATED APPLICATIONS

This application is related to U.S. patent application Ser. No. 13/039,125 filed Mar. 25, 2011 and entitled "System and Method for Determining Network Application Signatures Using Flow Payloads," which is incorporated herein by reference. The U.S. patent application Ser. No. 13/039,125 filed Mar. 25, 2011 is now issued as U.S. Pat. No. 8,402,543.

BACKGROUND OF THE INVENTION

1. Field of the Invention

The present invention relates to computers and computer networks. More particularly, the invention relates to profiling Internet traffic flows to identify network applications responsible for the traffic flows.

2. Background of the Related Art

The evolution of the Internet in the last few years has been characterized by dramatic changes to the way users behave, interact and utilize the network. When coupled with the explosion of new applications sitting on the wire and the rising number of political, economic, and legal struggles over appropriate use of network bandwidth, it is easy to understand why now, more than ever, network operators are eager to posses a more precise and broader-in-scope information on which network applications are using their networks. The commercial world answered to this growing demand providing high-speed packet inspection appliances able to process up to 40 Gbps (gigabits per second) of traffic and supporting hundreds of packet content signatures. Still they appear to struggle in keeping up with the exponential rate at which new applications appear in the network. As a result, the attention of the research community has diverted to flow-based behavioral analysis techniques by applying sophisticated data mining algorithms that work on traffic flows (i.e., ignore packet content) to extract and analyze hidden properties of the traffic either in the forms of "social interaction" of hosts engaged in the communication or in the forms of "spatial-temporal analysis" of features such as flow duration, number and size of packets per flow, inter-packet arrival time. Apart from problems such as false positive and false negatives, these techniques are principally aimed at classifying a traffic flow with a broader application class (e.g., "P2P" (peer-to-peer) application class) rather than revealing the specific application (e.g., "P2P-KaZaA" of the many applications in the P2P application class) responsible for the traffic flow.

The demand for bandwidth management tools that optimize network performance and provide quality-of-service guarantees has increased substantially in recent years, in part, due to the phenomenal growth of bandwidth-hungry P2P applications. It is, therefore, not surprising that many network operators are interested in tools to manage traffic such that traffic critical to business or traffic with real-time constraints is given higher priority service on their network. Furthermore, security is becoming a challenge. Networks and institutions of any size are constantly being targeted with more and more sophisticated attacks. Critical for the success of any such tool is its ability to accurately, and in real-time, identify and categorize each network flow by the application responsible for the flow. Identifying network traffic using port numbers and protocol (e.g., layer-four protocols, such as TCP, UDP, etc.) was the norm in the recent past. This approach was successful because many traditional applications (e.g., layer-seven applications, such as HTTP, SMTP, etc.) use port numbers (e.g., port 80, port 25, etc.) assigned by or registered with the Internet Assigned Numbers Authority (IANA). For example, this technique labels all traffic on TCP port 80 to be HTTP traffic, all traffic on TCP port 25 to be SMTP, and so on. This approach is extremely simple to implement and introduces very little overhead on the classifier. The accuracy of this approach, however, has been seriously reduced because of the evolution of applications that do not communicate on standardized ports. Many current generation P2P applications use ephemeral ports, and in some cases, use ports of well-known services such as Web and FTP to make them indistinguishable to the port-based classifier. For example, BitTorrent® (a registered trademark of BitTorrent, Inc., San Francisco, Calif.) can run on TCP port 80 if all the other ports are blocked. In addition, applications can use or abuse random ports for communication. For example, BitTorrent® can communicate on any TCP or UDP network port that is configured by the user. Furthermore, applications can tunnel traffic inside other applications to prevent detection and/or for ease of implementation. For example, BitTorrent® can send all its data inside a HTTP session. These strategies at the application-level have essentially made port number based traffic classification inaccurate and hence ineffective.

To overcome these issues with port-based approach, techniques that rely on application payload have been developed. Typically, a payload content based signature is developed for a given application by reverse engineering the application/protocol. These signatures are agnostic to the application port usage and are usually accurate (i.e., low false positive and false negative rates). However, this approach faces the problem of scalability. In other words, keeping up with the number of applications that come up everyday is impractical due to the laborious manual reverse engineering process. For example, several hundred new P2P and gaming protocols have been introduced over the last several years. Reverse engineering all these applications in a timely manner requires a huge manual effort. In addition, reverse engineering these applications becomes increasingly difficult when applications use encryption to avoid detection. As a consequence, keeping a comprehensive and up-to-date list of application signatures is infeasible.

As is known to those skilled in the art, the web (or "World Wide Web") is a system of interlinked hypertext documents (i.e., web pages) accessed via the Internet using URLs (i.e., Universal Resource Locators) and IP-addresses. The Internet is composed of machines (e.g., computers or other devices with Internet access) associated with IP-addresses for identifying and communicating with each other on the Internet. The Internet, URL, and IP-addresses are well known to those skilled in the art. The machines composing the Internet are called endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts. In vast majority of scenarios, information about servers such as the IP-address is publicly available for user to access. In peer-to-peer based communication, in which all endpoints can act both as clients or servers, the association between an end point and the P2P application becomes publicly visible. Even in the classical client-server communication scenario, information about clients such as website user access logs, forums, proxy logs, etc. also stay publicly available. Given that many forms of communication and various endpoint behaviors do get captured and archived, enormous amount of information valuable for profiling or characterizing endpoint behavior at a global scale is publicly available but has not been systematically utilized for such purpose.

SUMMARY

Generally, embodiments of the invention provide a system and method to develop accurate payload content based signatures without manual intervention for individual application (or application layer protocols) such that they can be used for real-time classification of flows. The architecture described herein decouples the real-time traffic classifier from the offline signature generation algorithms executed in an offline training phase. All the flows that are not labeled by the real-time classifier are grouped together as a flow-set based on a pre-determined criterion (e.g., common (port number, transport protocol) pair shared by each flow of the flow-set) and sent to the signature generation module, which uses offline signature generation algorithms during an offline training phase with no real-time performance constraint for extracting application signatures.

In one or more embodiments of the invention, the application signature is based on both the longest common substrings (referred to as signature terms) and the ordering of these signature terms in the flow payload. The ordered signature terms in multiple flows within a training set is represented as a state machine where the total number of states is minimized while ensuring that incoming flows can be identified in a real-time manner using the state machine.

In general, in one aspect, the present invention relates to a method for profiling network traffic of a network. The method includes (1) identifying, using a processor of a computer system and based on a pre-determined criterion, a training set from a plurality of flows obtained from the network traffic, wherein the training set is associated with a network application and comprises a plurality of captured payloads corresponding to the plurality of flows, (2) determining, using the processor and based on a first pre-determined algorithm, a set of signature terms from the training set, wherein the set of signature terms are selected from a plurality of substrings extracted from the plurality of captured payloads, (3) representing a portion of the plurality of captured payloads as a plurality of regular expressions, each comprising a first sequence of one or more signature terms based on the set of signature terms, (4) representing a first regular expression of the plurality of regular expressions as a first path of a plurality of paths in a term transition state machine (TTSM), the TTSM comprising a plurality of states coupled by a plurality of links comprising a first link, coupling first and second states of the plurality of states to form a portion of the first path, that is assigned a first signature term and a first transition probability, the first transition probability corresponding to a first signature term transition, transitioning to the first signature term, in the first regular expression, and (5) analyzing, using the processor and based on the TTSM according to at least the first transition probability, a flow separate from the plurality of flows and associated with a server in the network to determine the server as executing the network application.

In general, in one aspect, the present invention relates to a computer readable medium storing instructions, when executed by the computer to profile network traffic of a network, the instructions include functionality for (1) identifying, based on a pre-determined criterion, a training set from a plurality of flows obtained from the network traffic, wherein the training set is associated with a network application and comprises a plurality of captured payloads corresponding to the plurality of flows, (2) determining, based on a first pre-determined algorithm, a set of signature terms from the training set, wherein the set of signature terms are selected from a plurality of substrings extracted from the plurality of captured payloads, (3) representing a portion of the plurality of captured payloads as a plurality of regular expressions, each comprising a first sequence of one or more signature terms based on the set of signature terms, (4) representing a first regular expression of the plurality of regular expressions as a first path of a plurality of paths in a term transition state machine (TTSM), the TTSM comprising a plurality of states coupled by a plurality of links comprising a first link, coupling first and second states of the plurality of states to form a portion of the first path, that is assigned a first signature term and a first transition probability, the first transition probability corresponding to a first signature term transition, transitioning to the first signature term, in the first regular expression, and (5) analyzing, based on the TTSM according to at least the first transition probability, a flow separate from the plurality of flows and associated with a server in the network to determine the server as executing the network application.

In general, in one aspect, the present invention relates to a system for profiling network traffic of a network. The system includes (1) a data collector configured to obtain, from the network traffic, a plurality of flows, (2) a statistical analyzer configured to identify, from the plurality of flows, a training set comprising a plurality of captured payloads corresponding to the plurality of flows, (3) a profiler configured to identify the training set as associated with a network application, (4) a signature generator configured to: (i) determine, based on a first pre-determined algorithm, a set of signature terms from the training set, wherein the set of signature terms are selected from a plurality of substrings extracted from the plurality of captured payloads, (ii) represent a portion of the plurality of captured payloads as a plurality of regular expressions, each comprising a first sequence of one or more signature terms based on the set of signature terms, and (iii) represent a first regular expression of the plurality of regular expressions as a first path of a plurality of paths in a term transition state machine (TTSM), the TTSM comprising a plurality of states coupled by a plurality of links comprising a first link, coupling first and second states of the plurality of states to form a portion of the first path, that is assigned a first signature term and a first transition probability, the first transition probability corresponding to a first signature term transition, transitioning to the first signature term, in the first regular expression, (5) a processor and memory storing instructions when executed by the processor comprising functionalities to analyze, based on the TTSM according to at least the first transition probability, a flow separate from the plurality of flows and associated with a server in the network to determine the server as executing the network application, and (6) a repository configured to store the set of signature terms and the TTSM.

Other aspects and advantages of the invention will be apparent from the following description and the appended claims.

DETAILED DESCRIPTION

Figure 1:
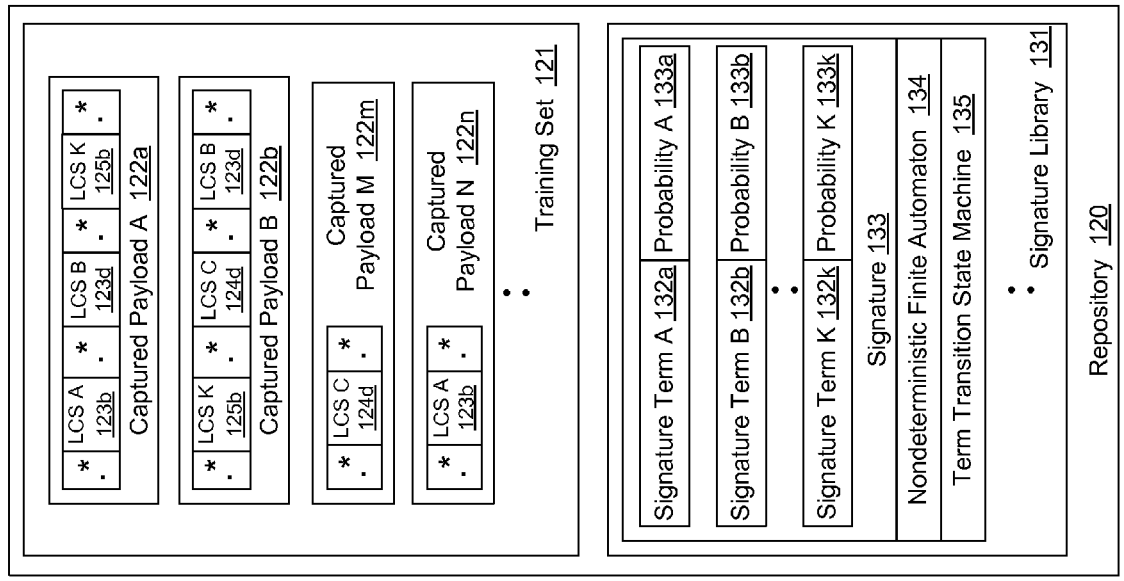
FIG. 1 shows a system block diagram according to aspects of the invention.
Figure 1:
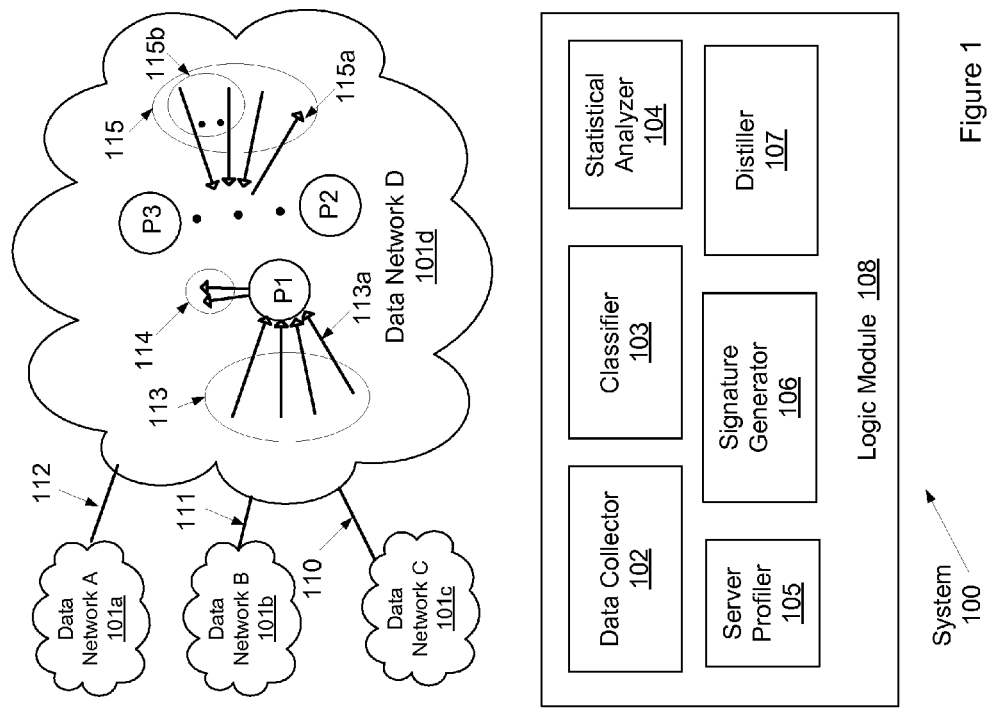

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally, a flow (or traffic stream) between two network hosts is a series of data records (referred to as packets or data packets) regarding the communication between the two network hosts engaged in an Internet transaction. The Internet transaction may be related to completing a task, which may be legitimate or malicious. Each packet includes a block of data (i.e., actual packet content referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow. Throughout this disclosure, the terms "traffic flow", "flow", "traffic stream" and "stream" are used interchangeably and may refer to a complete flow or any portion thereof depending on the context unless explicitly stated otherwise.

Further, the term "transport protocol" refers to a protocol associated with or based on top of a transport layer of a computer network. For example, the transport protocol may be referred to as layer-four protocol with respect to the OSI model (i.e., Open Systems Interconnection Reference Model of the network architecture). Examples of layer-four protocols include TCP, UDP, etc.

Further still, the term "application" or "network application" refers to an application associated with or based on top of an application layer of a computer network while the term "signature" or "packet content signature" refers to an application layer packet content based signature. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent®, GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Packet capture is the act of capturing data packets crossing a network. Partial packet capture may be performed to record headers without recording the total content of corresponding payloads. Deep packet capture may be performed to capture complete network packets including each packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy. Throughout this disclosure, a complete network packet including packet header and complete packet payload may be referred to as a full payload packet while the complete packet payload may be referred to as a full packet payload. The term "payload" may refer to full packet payload, partial packet payload, a collection of full/partial packet payloads within a flow or a portion thereof, in an interchangeable manner depending on the context unless explicitly stated otherwise.

In one or more embodiments of the invention, when full payload packets of input flows are received, a real-time classifier first reconstructs flows and then makes an attempt to label these flows using any existing packet content based signatures. If the classifier successfully labels a flow, then the result is recorded in a database. The classification process for the flow ends. However, if the classifier cannot label the flow, then the flow is sent to a packet content signature generation process. Also, the classifier sends the server IP-address used in the flow to a server profiler. The main task of the server profiler is to find the application/protocol associated with the IP-address. Based on the flow(s) from the classifier and application/protocol name from the server profiler, a statistical analyzer first forms a cohesive flow-set by grouping the flows received from the classifier that share same characteristics (e.g., common (port number, transport protocol) pair), and a signature generator subsequently extracts a set of signature terms to form a signature for the flow-set. In one or more embodiments, the signature generator is aware of only one flow-set being processed and is unaware of the existence of other flow-sets. In such embodiments, the signature generator does not have a global view of all existing signatures and flow-sets. Instead, a distiller receives any new signature generated by the signature generator and examines it along with all the other signatures that already exist in a signature library to check for conflicts and determine a quality metric for each of the extracted signatures based on a global view of all the existing signatures.

Based on the architecture described above and the reason described below, a false-negative (a flow failed to be labeled even though a signature exists in the signature library for the application associated with the flow) may be more tolerable than a false-positive (a flow that are misclassified). Specifically, the signatures for applications are generated to populate the signature library incrementally as flows generated by these applications are analyzed. Initially, there are no signatures in the signature library. When the first set of application flows are analyzed, a new signature for a particular application is generated and accordingly the signature library has one signature for the particular application. Henceforth all the flows that belong to the application (i.e., generated to execute the application) are classified and thus do not enter the offline training phase. Now, if the signature is not very accurate, then several flows that do not belong to the application may get misclassified as belonging to the application. These misclassified flows (i.e. false-positives) will never be available for subsequent training (i.e., signature generation) thus false-positive errors of the real-time classifier continue to occur. In contrast, those flows that are not classified due to false negatives are sent to the signature generator and used to generate another signature later on when sufficient number of flows is grouped into a cohesive flow-set. Accordingly, false-negative errors of the real-time classifier may be reduced as time goes on.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

A shown in FIG. 1, the system (100) includes data networks A through D (101a, 101b, 101c, 101d), a logic module (108), and a repository (120). Each of these networks A through D may be a portion of a larger network and are shown to be coupled via links (110, 111, 112). The network D (101d) includes hosts (P1, P2, P3, etc.). As shown, host (P1) is a source or destination associated with flows (113, 114) while hosts (P2, P3, etc.) are source(s) or destination(s) associated with flows (115). Accordingly, the flows (113, 114) are referred to as attached to the server (P1) while the flows (115) are referred to as attached to the servers (P2, P3, etc.). In particular, the flows (113) include a particular flow (113a) while the flows (115) include another particular flow (115a). Further, a portion of the flows (115) is a set of unidirectional flows (115b). Each flow (e.g., flow (113a), flow (115a)) in these flows (113, 114, 115) includes full payload packets. In one or more embodiments of the invention, each flow in these flows (113, 114, 115) relates to an application executing on the attached server at a particular time. For example, flows (113) may include HTTP GET commands sent from various clients to the server (P1) while the flows (114) may include HTTP TRACE commands sent from the server (P1) to various clients. Accordingly, the flows (113, 114) are referred to as "associated with an application executing on server (P1)", "corresponding to an application executing on server (P1), "generated by an application executing on server (P1)", "generated to execute an application on server (P1)", or "generated for executing an application on server (P1)" in an interchangeable manner depending on the context unless explicitly stated otherwise.

As shown in FIG. 1, the logic module (108) includes a data collector (102), a classifier (103), a statistical analyzer (104), a server profiler (105), a signature generator (106), and a distiller (107). The data collector (102), the classifier (103), and the statistical analyzer (104) may be referred to as a stream processor or a flow processor.

Further as shown in FIG. 1, the repository (120) includes a training set (121) and a signature library (131). The training set (121) is shown to include a number of captured payloads A through N (122a, 122b, 122n, etc.) each including a sequence of packet payloads captured from one flow (e.g., a flow in the flows (115)). In one or more embodiments, such sequence of packet payloads is captured from a portion (e.g., up to the first 50 packets or the first 1000 payload bytes) of such one flow. In one or more embodiments, a packet payload in such sequence of packet payloads is a full packet payload, or a portion thereof, in one packet of the flow. In particular, the sequence of packet payloads included in a captured payload (e.g., captured payload A (122a)) consists of packet payloads extracted from multiple packets and concatenated according to an order based on sequence information contained in corresponding packet headers. In one or more embodiments, packet headers (not shown), or information derived therefrom, may also be included in the training set (121) where each packet header, or information derived therefrom, is linked to a corresponding captured payload or a packet payload contained therein. In one or more embodiments, the training set (121) is extracted from a collected flow-set (not shown) and separately stored in the repository (120). In one or more embodiments, the training set (121) is embedded in a collected flow-set (not shown) that is stored in the repository (120). In such embodiments, the captured payloads (e.g., captured payload A (122a)) are extracted from the flow-set as needed during processing for signature extraction. In one or more embodiments, a captured payload (e.g., captured payload A (122a)) is extracted in real time as a flow is obtained. In such embodiments, such captured payload is stored in the repository (120) to form the training set (121) without storing a separate flow-set in the repository (120).

The signature library (131) is shown to include one or more signatures (e.g., signature (133)) each associated with a non-deterministic finite automaton (NFA) (e.g., NFA (134)) and a term transition state machine (TTSM) (e.g., TTSM (135)) representing the associated signature. As shown, the signature (133) includes signature terms A through K (132a, 132b, 123k, etc.) corresponding to probabilities A through K (133a, 133b, 133k, etc.). Further, the signature (133) is represented by the NFA (134) and/or TTSM (135). In one or more embodiments, the NFA (134) is generated from the signature (133) prior to the TTSM (135) is converted from the NFA (134). In one or more embodiments, the TTSM (135) is generated directly from the signature (133). In such embodiments, the NFA (134) may be omitted from the signature library (131). In one or more embodiments, the signature library (131) may be implemented as a database, a file, a linked list, or any other suitable data structures.

In one or more embodiments, the data collector (102) is configured to obtain, from the network traffic (e.g., including all of flows (113), flows (114), flows (115), etc.), a flow-set (i.e., a set of flows, such as one or flows (113), flows (114), flows (115), flows (115b), etc.) associated with a number of servers (e.g., server (P1), server (P2), server (P3), etc.) executing one or more network applications in the network. Specifically, the data collector (102) may observe and collect, for example from links (110, 111, 112), information regarding network traffic when available and to filter and organize the collected traffic data regarding duplicate records or out-of-order records. Accordingly, the collected traffic data is reconstructed to represent data packets of a flow in an appropriated order (e.g., based on sequence information in the headers) consistent with the Internet transaction performed by the flow. Throughout this disclosure, "obtaining a flow" may refer to obtaining a complete flow or any portion thereof depending on the context unless explicitly stated otherwise.

In one or more embodiments, the output of the data collector (102) includes a captured payload (e.g., captured payload A (122a), etc.) of a flow (e.g., flow (113a), flow (115a)) and is provided to the classifier (103) configured to either identify an application (e.g., HTTP) (e.g., associated with the flow (113a)) or to pass information (e.g., a captured payload or a reference thereof) of a not-yet-identifiable flow (e.g., flow (115a)) to the statistical analyzer (104). In particular, the captured payloads (e.g., captured payload A (122a), etc.), when included in the training set (121), are already processed by the data collector (102) regarding duplicate records or out-of-order records based on corresponding packet headers.

In one or more embodiments, the classifier (103) is configured to classify the flows collected and processed by the data collector (102) in real time using a list of known signatures (e.g., signature (133)) in the signature library (131), which are previously extracted/generated by the signature generator (106). For example, concurrently with a portion of a flow being generated in response to the attached server executing a network application to complete a task (e.g., by performing an Internet transaction), data packets in the portion of the flow are processed by the classifier (103) in an expedient manner to identify the particular network application prior to the task or the flow being completed by the attached server. Every flow received from data collector (102) for which a signature is available is classified (i.e., associated with an application) and promptly reported to the end-user (not shown). Accordingly, an alert may be generated in time to block a malicious flow aimed at performing a malicious Internet transaction or other malicious task.

In one or more embodiments, when an unknown flow (i.e., flow (115a) for which a signature is not yet available in the signature library (131)) is observed, the classifier (103) forwards the unknown flow, or related information thereof, to the statistical analyzer (104) to be added to a training set (121) for generating a new signature subsequently. In one or more embodiments, the flow (115a), or related information thereof, may be sent from the data collector (102) to the statistical analyzer (104) directly bypassing the classifier (103), for example when there is no signature in the signature library (131) initially.

In one or more embodiments, the statistical analyzer (104) is configured to identify the training set (121) from a set of flows (i.e., a flow-set, such as the set of unidirectional flows (115b)), or captured payloads thereof, based on a pre-determined criterion. The training set may be identified using many different schemes such that the training set is a statistically representative subset of flows associated with a particular network application. In one or more embodiments, the training set (121) includes the captured payloads and other relevant portion of the statistically representative subset of flows. An example method of identifying the training set from a cohesive flow-set is described in related U.S. patent application Ser. No. 13/039,125 filed Mar. 25, 2011 and entitled "System and Method for Determining Network Application Signatures Using Flow Payloads," which is incorporated herein by reference. The U.S. patent application Ser. No. 13/039,125 filed Mar. 25, 2011 is now issued as U.S. Pat. No. 8,402,543.

In one or more embodiments, each server contributing to the training set (121) is tagged with a network application. For example, such network application may be tagged based on the Internet Assigned Numbers Authority (IANA) standard. Another example method for tagging a server with a network application is described in U.S. patent application Ser. No. 12/104,723 filed Apr. 17, 2008 and entitled "System and Method for Internet Endpoint Profiling," which is incorporated herein by reference. In one or more embodiments, the server profiler (105) tallies the number of servers executing each of the tagged network applications to identify the network application executing on a maximum number of servers in the tallied result as the particular network application associated with the training set. In one or more embodiments, flows associated with different network applications than the particular network application identified by the server profiler (105) are explicitly eliminated from the training set. In one or more embodiments, flows associated with different network applications than the particular network application identified by the server profiler (105) remains in the training set with their contribution to signature generation implicitly suppressed based on the signature generation algorithm.

In one or more embodiments, the signature generator (106) is configured to identify signature term candidates (e.g., LCS A (123b), LCS B (123d), LCS K (125b), LCS C (124d)) from the captured payloads (e.g., captured payload A (122a), captured payload B (122b), captured payload M (122m), captured payload N (122n)) in the training set (121) based on a pre-determined algorithm. The signature term candidates may be identified from captured payloads using many different schemes.

In one or more embodiments, a captured payload (e.g., captured payload A (122a)) in the training set (121) is considered as a string (e.g., of data bytes or characters from multiple packets corresponding to the captured payload). The longest common substring is the longest substring that is common to (i.e., exists simultaneously in) two or more such strings. For example, the longest common substrings of the strings "ABAB", "BABA" and "ABBA" are the strings "AB" and "BA" of length 2. Other common substrings are "A" and "B", which are not longest common substring as they are shorter in length. An example method of identifying longest common substrings as the signature term candidates from a collection of captured payloads is described in related U.S. patent application Ser. No. 13/039,125 filed Mar. 25, 2011 and entitled "System and Method for Determining Network Application Signatures Using Flow Payloads," which is incorporated herein by reference. The U.S. patent application Ser. No. 13/039,125 filed Mar. 25, 2011 is now issued as U.S. Pat. No. 8,402,543. In other examples, the signature term candidates may be identified from captured payloads using other different schemes.

As shown in FIG. 1, the captured payload A (122a) includes three signature term candidates LCS A (123b), LCS B (123d), and LCS K (125b) interposed in wildcard substrings (.*). The captured payload B (122b) includes three signature term candidates LCS K (125b), LCS C (124d), and LCS B (123d) interposed in wildcard substrings (.*). The captured payload M (122m) includes a substring LCS C (124d) interposed in wildcard substrings (.*). The captured payload N (122n) includes a substring LCS A (123b) interposed in wildcard substrings (.*). As is known to those skilled in the art, a wildcard substring (.*) contains non-pre-determined data bytes (or characters) that substitutes for other data bytes (or characters) in a regular expression, which is an expression known to those skilled in the art that describes a set of substrings in a string as an ordered sequence. For example, the signature term candidates LCS A (123b), LCS B (123d), LCS K (125b), and LCS C (124d) may be longest common substrings of the captured payloads in the training set (121) while each of the LCS A (123b), LCS B (123d), and LCS K (125b) is a substring embedded in a captured payload represented by a regular expression as described below.

In one or more embodiments, the signature generator (106) is configured to qualify the identified signature term candidates into signature terms. In one or more embodiments, an identified signature term candidates is determined to be a signature term if its length exceeds a pre-determined length threshold and its probability of occurrence exceeds a pre-determined noise threshold. In such embodiments, the signature generator (106) is configured to calculate a probability of occurrence of each identified signature term candidates by analyzing all captured payloads in the entire training set (121) and tallying the total number that each identified signature term candidate occurs in the entire training set (121). For example, the probability of occurrence may be calculated as a non-normalized occurrence count (e.g., 100 times) or as a normalized percentage (e.g., 10% of total 1000 times) of total count of all identified signature term candidate in the training set (121).

For example, if the pre-determined length threshold is four bytes and the pre-determined noise threshold is 100 times, an identified signature term candidates has to be four bytes or longer and occurs more than 100 times in the training set (121) to be determined as a signature term. As shown, the LCS A (123b), LCS B (123d), and LCS K (125b) are determined as meeting this requirement and are stored in the signature library (131) as the signature term A (132a), signature term B (132b), and signature term K (132k), respectively. In addition, the number of times each of the LCS A (123b), LCS B (123d), and LCS K (125b) occurs in the training set (121) is also stored in the signature library (131), associated with the respective signature term, as the probability A (133a), probability B (133b), and probability K (133k), respectively. In contrast, the LCS C (124d) is determined as failing to meet the aforementioned requirement and not stored in the signature library (131). For example, LCS C (124d) may either be less than four bytes long or occurs less than the example noise threshold of 100 times in the training set (121).

In one or more embodiments, determining an identified signature term candidate to be a signature term requires additional qualification based on a pre-determined criterion. More details of various qualification requirements are described below with respect to the signature term popularity threshold, signature terms count threshold, and mutually exclusive signature term grouping.

All signatures terms determined based on the training set (121) are collectively referred to as the signature (133), which is considered to be associated with the particular network application of the training set (121). Although not specifically shown in FIG. 1, more than one training set may be identified as statistically representative subset of flows associated with the particular network application. Accordingly, more than one signature may be determined as associated with the particular network application and stored in the signature library (131).

In one or more embodiments, the signatures stored in each signature in the signature library (131) may be qualified using the distiller (107). For example, the distiller (107) may be configured to perform various tasks described below.

First, the distiller (107) expires signatures characterized by long inactivity time, i.e., the last time a flow was matched those signatures by the classifier (103) exceeded a pre-specified internal threshold. This task is referred to as signature-expiration process.

Second, for the remainder signatures in the signature library (131), the distiller (107) provides an indicator that reflects the overall quality of the signatures present in the signature library (131) such as to alert the situations in which distinct signatures may look similar. This second task is referred to as signature quality estimation process.

Third, distiller (107) decides whether a new signature can be appropriately added to the signature library (131) without compromising the quality of the current signatures. A set of signatures is said to be of good quality if the signatures constituting the set are dissimilar from each other based on a pre-determined similarity measure. This task is referred to as signature-specific quality estimation process.

Fourth, the distiller (107) is responsible to optimize the signature library (131) by deciding which signatures can be consolidated, i.e., appending more than one signature to the same network application. This task is referred to as signature consolidation process.

In one or more embodiments, subsequent to compiling and/or qualifying the signature library (131), the signature generator (106) is further configured to analyze each of the captured payloads in the training set (121) to identify any signature term contained therein. In addition, the signature term(s) identified in a captured payload forms an ordered sequence of signature term(s). For example in FIG. 1, the captured payload A (122a) includes the ordered sequence of <LCS A (123b), LCS B (123d), LCS K (125b)>, the captured payload B (122b) includes the ordered sequence of <LCS K (125b), LCS B (123d)>, the captured payload M (122m) does not include any ordered sequence of signature term(s), and the captured payload N (122n) includes the ordered sequence of <LCS A (123b)>. As described above, LCS C (124d) is not determined as a signature term therefore is excluded from the ordered sequence of signature terms.

In one or more embodiments, the signature generator (106) is further configured to represent each of the captured payloads in the training set (121) as a regular expression based on the signature terms (e.g., signature term A (132a), signature term B (132b), signature term K (132k)) contained in the signature library (131). In particular, the regular expression describes the aforementioned ordered sequence of signature terms in the captured payload. For example, the captured payload A (122a) may be represented as a regular expression based on the signature term A (132a), signature term B (132b), and signature term K (132k) corresponding to the LCS A (123b), LCS B (123d), and LCS K (125b). Similarly, the captured payload B (122b) may be represented as a regular expression based on the signature term K (132k) and signature term B (132b) corresponding to the LCS K (125b) and LCS B (123d). The captured payload N (122n) may be represented as a regular expression based on the signature term A (132a) corresponding to the LCS A (123b). Although the example here shows regular expressions based on one, two, or three signature terms, other example captured payloads (not shown) represented by regular expressions having any number of signature terms may be found in the training set (121).

In one or more embodiments, the signature generator (106) is further configured to represent the collection of regular expressions in the training set (121), which are based on signature terms in the signature (133), as a nondeterministic finite automaton (NFA) (134) and store it in the signature library (131) as associated with the signature (133). In one or more embodiments, algorithms known to those skilled in the art may be used to convert the collection of regular expressions into the NFA (134). An example of converting the collection of regular expressions into the NFA (134) is described in reference to FIGS. 3a-3g below.

In one or more embodiments, the classifier (103) is configured to match a newly received flow (e.g., flow (113a) to the signature (133) using the NFA (134). In particular, the newly received flow is not part of the training set. The flow (113a) is said to match the signature (133) if the flow (113a) contains any regular expression in the training set (121). An example of using NFA simulation based on the NFA (134) to match the flow (113a) to the signature (133) is described in reference to FIGS. 3a-3g below.

As described in reference to FIGS. 3a-3g, the NFA is simulated by maintaining a set of active states. When the number of paths in a NFA is large, the number of active states may increase to a point to drastically degrade the matching performance. For example, if the number of signature terms (e.g., signature term A (132a), etc.) in the signature (133) is a large number, the NFA (134) may also have a large number of paths. Two thresholds may be employed to reduce the number of signature terms in the signature (133), namely: signature term popularity threshold P and signature terms count threshold N. The signature term popularity threshold is used to select only those signature term candidates with a probability greater than P. For example, probability A (133a) needs to exceed P for the signature terms A (132a) to be included in the signature (133). The signature terms count threshold is used to select at most the top-N signature term candidates with the highest probabilities. In one or more embodiments, the signature generator (106) is configured to further qualify the identified signature term candidates into signature terms based on the additional requirements imposed by the signature term popularity threshold and the signature terms count threshold.

In some examples, several important signature term candidates may be eliminated by imposing the above thresholds.

Figure 3A:
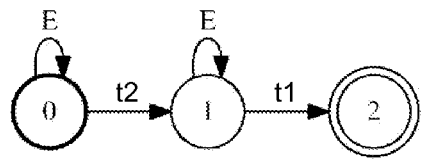
FIGS. 3a-3k, 3m-3n, and 3p shows various examples according to aspects of the invention.

For example, consider the popular HTTP protocol. There are several methods used in this protocol, such as GET, POST, HEAD, PUT, DELETE, etc. Each of these methods may not have a high probability of occurrence; however all of these methods do occur when analyzing many HTTP flows. Signature term candidates representing these methods will be eliminated by a high setting of signature term popularity threshold. In one or more embodiments, the signature generator (106) is configured to implement mutually exclusive signature term grouping, which is a process by which signature term probabilities are grouped together before comparing to the signature term popularity threshold for including in the signature (133). Specifically, this occurs when two conditions are satisfied: (1) the signature terms that belong to the same mutually exclusive signature term group do not occur in the same flow payload, i.e., the signature terms occur mutually exclusively from each other and (2) the combined probability of all signature terms in a mutually exclusive signature term group exceeds the signature term probability threshold. Note that the combined probability of a mutually exclusive term group is the sum of the probabilities of all the signature terms in the group. We add all the terms in the mutually exclusive As will become clear based on later description in reference to FIGS. 3a-3g, even when the number of signature terms is relatively small in the signature (133), the number of paths in the NFA (134) may still be large due to two factors: (i) a large number of unique signature term sequences of different length may occur from a small set of signature terms as the length of the signature term sequences is not fixed, and (ii) presence of self loops on all internal states means any state that is added to the set of active state is never removed. Thus a large number of active states may exist at each step of matching at classification time resulting in performance degradation. To illustrate this further, the NFA (300) shown in FIG. 3i is considered. For this NFA, table 1 shows the set of all active states after each signature term is examined in a flow payload according to the NFA simulation scheme described in reference to FIGS. 3a-3g below. It can be seen that four states are active simultaneously after matching three signature terms. This implies that when the next term in the sequence arrives, all four active states have to be examined and their transitions thereafter. Also, this could result in more active state in the next step. This operation becomes very expensive when the NFA is even larger.

TABLE 1

| Sequence Observed | Set of Active State |
|---|---|
| < > | {0} |
| < $t_1$ > | {0, 1} |
| < $t_1, t_3$ > | {0, 1, 2} |
| < $t_1, t_3, t_1$ > | {0, 1, 2, 3} |

One solution to the above matching performance degradation is to generate a deterministic finite-state automata (DFA) from the NFA. A DFA has only one active state at any time. There is a one-to-one correspondence between NFA and DFA, i.e., any NFA can be converted to an equivalent DFA that accepts the same regular expression language. However, converting a NFA to DFA can lead to state explosion. For application signatures containing a large number of unique signature term sequences, this state explosion can have severe impact on the memory requirements. In summary, DFAs are time-efficient but space-inefficient, and NFAs are space-efficient but time-inefficient.

In one or more embodiments, the signature generator (106) is further configured to represent the collection of regular expressions in the training set (121), which are based on signature terms in the signature (133), as a term transition state machine (TTSM) (135) and store it in the signature library (131) as associated with the signature (133). In particular, the TTSM (135) overcomes the limitations of NFA (134) for flow classification. Generally, a TTSM (e.g., TTSM (135)) falls in between the class of NFAs and DFAs, having the space characteristics similar to NFA and run-times similar to DFAs. It is noted that the benefits of TTSM come at the cost of some accuracy. However, as discussed above, this inaccuracy is acceptable for the system (100) in that it only increases false negatives but not false positives.

In one or more embodiments, TTSM (135) is equivalent to the NFA (134) with the exceptions that (1) all state transitions are annotated with (or assigned) a transition probability defined below and that (2) all self loops on internal states are eliminated without adding additional states. Based on the previous description of constructing NFA (134) to represent regular expressions in the training set (121) as well as the example depicted in FIGS. 3a-3g, each sequence of signature terms, as represented by a regular expression, in the training set (121) corresponds to a path in the NFA (134). Accordingly, each signature term transition (e.g., (.*)=>LCS A (123b), LCS A (123b)=>(.*)=>LCSB (123d), etc.) in each of the signature term sequence (e.g., embedded in the captured payload A (122a)) corresponds to a state transition in the NFA (134). In particular, for example, the signature term transition (.*)=>LCS A (123b) corresponds to a state transition from the starting state of the NFA (134). In one or more embodiments, the signature generator (106) is configured to calculate the transition probability each signature term transitions by analyzing all captured payloads in the entire training set (121) and tallying the total number that each signature term transition occurs in the entire training set (121). For example, the transition probability of a state transition in the NFA (134) may be calculated as a non-normalized occurrence count (e.g., 100 times) of the corresponding signature term transitions in the training set (121) or as a normalized occurrence account (e.g., 2 times per payload) by dividing the non-normalized occurrence count over the total number of payloads in the training set (121). As noted above, the TTSM (301) may be converted from the NFA (300) or generated directly from the signature (e.g., signature (133)) without generating the NFA (300) in an intermediate step. FIG. 3j shows an example TTSM (301) converted from the example NFA (300) in FIG. 3i. FIG. 3h shows an example TTSM (302) generated directly from a signature without generating an intermediate NFA.

In one or more embodiments, the classifier (103) is configured to match a newly received flow (e.g., flow (113a)) to the signature (133) using the TTSM (135). In particular, the newly received flow is not part of the training set. The flow (113a) is said to match the signature (133) if the flow (113a) contains any regular expression in the training set (121). More details of using the TTSM (135) to match the flow (113a) to the signature (133) is described in reference to FIGS. 2b-3i below.

Figure 2A:
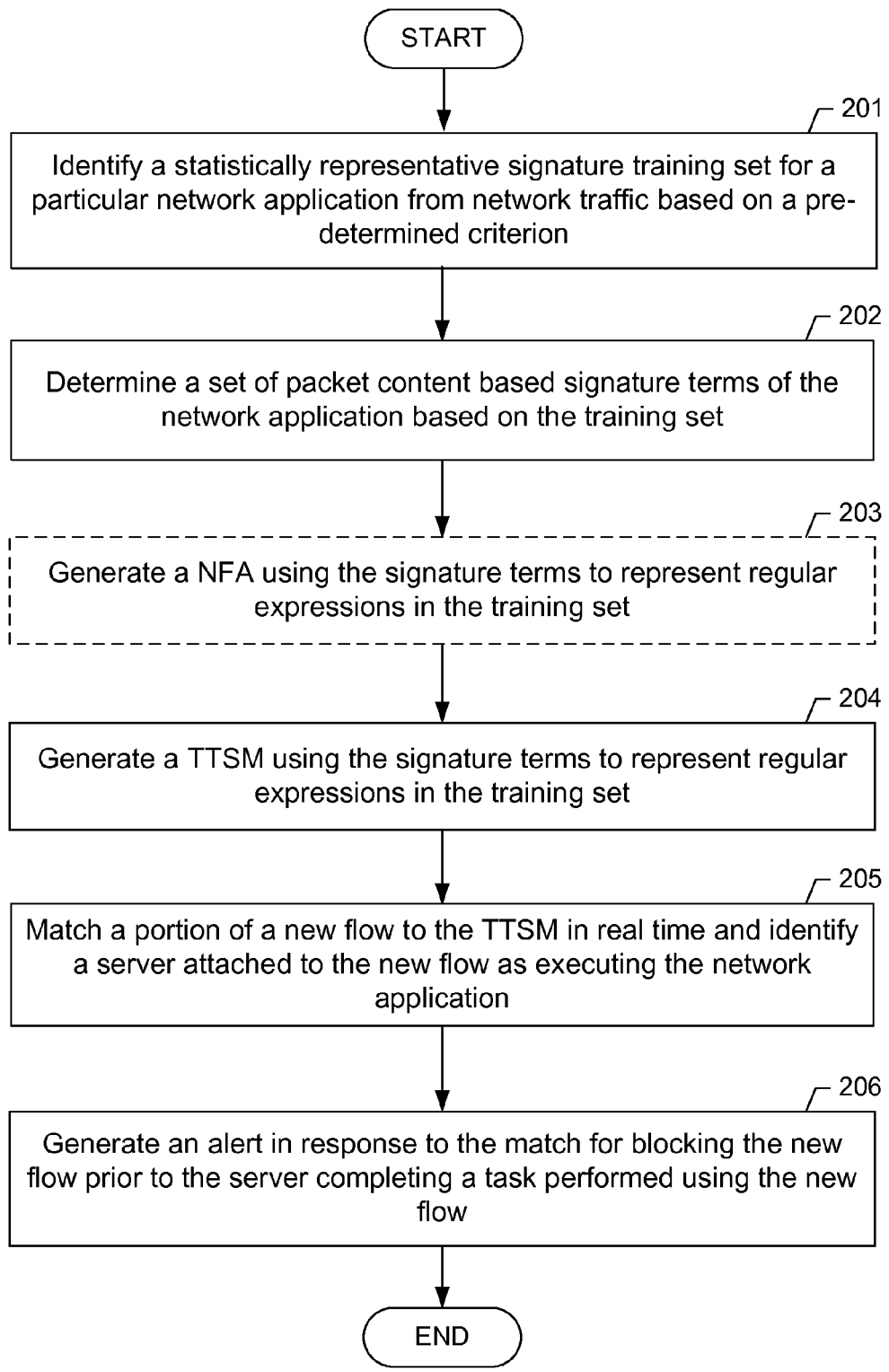
FIGS. 2a and 2b show flowcharts of a method according to aspects of the invention.
Figure 2B:
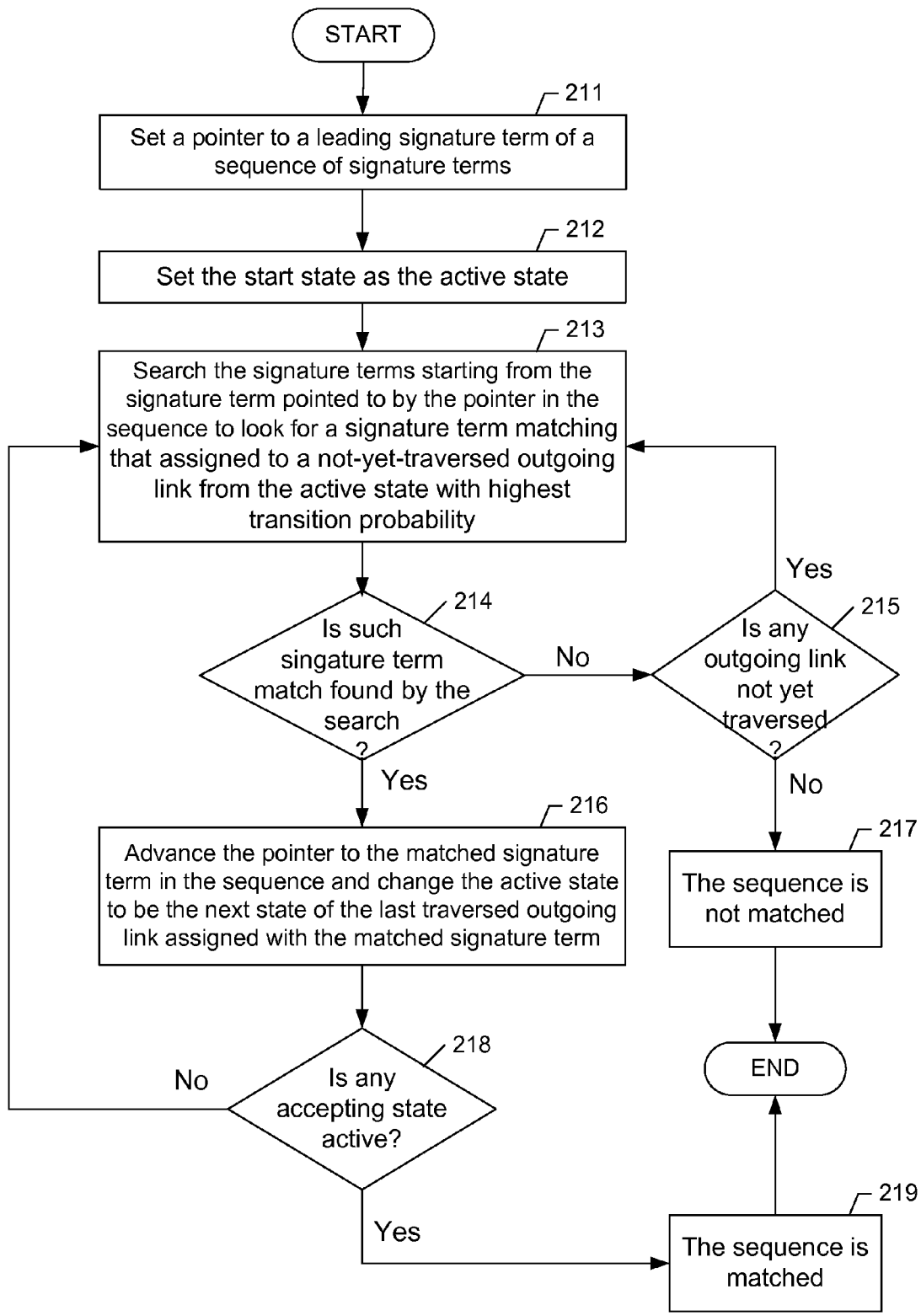

FIGS. 2a and 2b depict a flowchart of a method in accordance with one or more embodiments of the invention. In one or more embodiments of the invention, one or more of the steps shown in FIGS. 2a and 2b may be omitted, repeated, and/or performed in a different order. Accordingly, embodiments of the invention should not be considered limited to the specific arrangements of steps shown in FIGS. 2a and 2b. In one or more embodiments of the invention, the method depicted in FIGS. 2a and 2b may be practiced using system (100) described with respect to FIG. 1 above.

In particular, the method depicted in FIG. 2a automatically extracts payload content based signatures using the flow payloads in the incoming flow-sets associated with a network application. For example, the most frequently occurring terms are extracted from the flows identified by a unique (port number, transport protocol) pair. In other examples, different method may be used to extract payload content based signatures. Further, these terms are used to automatically build a term transition state machine (TTSM), which is used as the application signature to classify other flows as associated with the network application. The method depicted in FIG. 2b uses the TTSM to classify a new flow according to transition probabilities in the TTSM.

Turning to the discussion of FIG. 2a, initially in Step 201, a statistically representative signature training set is identified for a particular network application (e.g., layer-seven applications, such as HTTP, SMTP, etc.) from network traffic based on a pre-determined criterion. In one or more embodiments, the training set includes a set of captured payloads corresponding to a set of flows obtained from the network traffic. For example, the set of flows may be a cohesive flow set with each flow having the same (port number, transport protocol) as described in related U.S. patent application Ser. No. 13/039,125 filed Mar. 25, 2011 and entitled "System and Method for Determining Network Application Signatures Using Flow Payloads," which is incorporated herein by reference. The U.S. patent application Ser. No. 13/039,125 filed Mar. 25, 2011 is now issued as U.S. Pat. No. 8,402,543. In other example, different criteria may be used to obtain the flow-set and identify the training set therefrom.

In Step 202, a set of packet content based signature terms of the particular network application is determined based on a pre-determined algorithm. For example, the set of signature terms may be selected from longest common substrings extracted from the captured payloads in the training set as described in related U.S. patent application Ser. No. 13/039,125 filed Mar. 25, 2011 and entitled "System and Method for Determining Network Application Signatures Using Flow Payloads," which is incorporated herein by reference. The U.S. patent application Ser. No. 13/039,125 filed Mar. 25, 2011 is now issued as U.S. Pat. No. 8,402,543. In other example, different algorithms may be used to identify the set of signature terms from the training set payloads.

In one or more embodiments, a portion of the captured payloads in the training set is represented as regular expressions. Specifically, each regular expression includes a sequence of one or more signature terms based on the set of signature terms.

Optionally in Step 203, the regular expressions are represented as a nondeterministic finite automaton (NFA) known to those skilled in the art. In particular, the NFA includes multiple states coupled by links representing state transitions. Typically, an internal state of the NFA includes a self loop transition returning to itself. This NFA may be used as an intermediate step in generating a TTSM.

An example of Steps 201 through 203 may start with collecting several flows for SMTP protocol to form a SMTP training set from the aforementioned cohesive flow-set. Using this SMTP training set, several flow-subsets (e.g., with 50-100 flows in each subset) are constructed. These flow-subsets form the input to the common term extraction (ECT) algorithm presented in the aforementioned related U.S. Patent Application. The ECT algorithm returns a set of all terms that are common between at least two distinct flows in each flow-subset that meet a minimum length requirement. For example, the common strings extracted from any pair of flows in a flow-subset should be at least four bytes long, ensuring that accidental small length string matches are automatically filtered out. In an example SMTP training set identified from a real-life network trace, the ECT algorithm may extract more than 1200 terms in this step.

A large set of terms will significantly increase the computational complexity. Also, considering trivial terms that do not occur frequently in the flows will result in unwanted overhead. However, each term in a "mutually exclusive term group" can have lower probabilities, but the overall probability of the group can be high. In order to accommodate all of these criteria, the output of ECT is qualified using a probability threshold (e.g., 0.1). In an example, all the terms with a probability of occurrence that is less than 0.1 are eliminated. In the aforementioned example network trace, close to 100% of the terms having less than a probability of 0.1 are confirmed to be trivial/noise terms. Using this threshold significantly reduces the number of terms in the term set. In fact, in the aforementioned SMTP training set based on the real-life network trace, the number of terms is reduced from over 1200 to about 200.

Returning to the discussion of FIG. 2a, in Step 204, A TTSM is generated from the regular expressions created in Step 202 above. Described above in reference to FIG. 1, the TTSM includes multiple states coupled by a number of links. In one or more embodiments, a first link, coupling first and second states of the TTSM to form a portion of a first path representing a first regular expression, is assigned a first signature term and a first transition probability, where the first transition probability corresponds to a first signature term transition, transitioning to the first signature term, in the first regular expression. Further, a second link, coupling the first state and a second state of the TTSM to form a portion of a second path representing a second regular expression, is assigned a third signature term and a second transition probability, where the second transition probability corresponds to a second signature term transition, from a fourth signature term to the third signature term, in the second regular expression.

In one or more embodiments, the first transition probability is calculated based on a first count of tallying occurrence of the first signature term transition in all regular expressions of the training set. Similarly, the second transition probability is calculated based on a second count of tallying occurrence of the second signature term transition in all regular expressions of the training set. For example, the first and second transition probabilities may be calculated by dividing the first count and the second count, respectively, over a total number of captured payloads (or regular expressions) in the training set.

In one or more embodiments, the TTSM is generated directly from the regular expressions. In one or more embodiments, the TTSM is converted from the NFA generated in the optional Step 203 by assigning the calculated transition probabilities to the corresponding links in the NFA and eliminating all self loop transition(s) in the NFA. An example TTSM (302) generated directly from the regular expressions is described in reference to FIG. 3h below. In particular, the first link corresponds to $t_1/0.67$ coupling the first state (i.e., state 0) and the second (i.e., state 1) of the TTSM (302) to form a portion of a first path [state 0, state 1, state 3] representing a first regular expression $r_1$. The first link is assigned the first signature term $t_1$ and a first transition probability 0.67, where the first transition probability 0.67 corresponds to a first signature term transition, transitioning to the first signature term $t_1$ from (.*), in the first regular expression $r_1$. Further, a second link corresponds to $t_2/0.33$ coupling the first state (i.e., state 0)

and the third state (i.e., state 5) of the TTSM (302) to form a portion of a second path [state 0, state 5, state 6] representing a second regular expression $r_3$, is assigned a second signature term $t_2$ and a second transition probability 0.33, where the second transition probability 0.33 corresponds to a second signature term transition, transitioning to the second signature term $t_2$ from (.*), in the second regular expression $r_3$.

In one or more embodiments, the first transition probability 0.67 is calculated based on a first count of 2 by tallying occurrence of the first signature term transition (.*)=>$t_1$ in all regular expressions $r_1$, $r_2$, and $r_3$ of the training set. Similarly, the second transition probability 0.33 is calculated based on a second count of 1 by tallying occurrence of the second signature term transition (.*)=>$t_2$ in all regular expressions $r_1$, $r_2$, and $r_3$ of the training set. In the example of FIG. 3h, the first and second transition probabilities, are calculated by dividing the first count of 2 and the second count of 1, respectively, by the total number of captured payloads (i.e., 3) in the training set. More details of constructing the TTSM (302) and using it to analyze a flow for classification are described in reference to FIG. 3h below.

In Step 205, a portion of a new flow is matched, in real time, to the TTSM according to at least the first transition probability. As a result, a server associated with the new flow is determined as executing the network application associated with the training set. For example, using today's computer resources, a sufficient portion of a flow under classification may be matched within seconds using the TTSM. Therefore, a malicious network application executing on a server may be identified before a malicious task is performed by completing the flow under classification. Accordingly, an alert may be generated to allow a user (e.g., an operator of the network) to terminate or block the flow under classification prior to the malicious task is performed.

Continuing with the discussion using the aforementioned SMTP training set, the occurrence probability for signature terms was required to be at least 0.1 to eliminate the "noise" in the signature term set. An additional probability threshold (referred to as popularity threshold) may be defined to qualify those signature terms that are the important ones. In the aforementioned example SMTP training set, the popularity threshold is set to be 0.8. Stated otherwise, a signature term with probability greater than 0.8 will be considered as an important signature term. Using this popularity threshold on the SMTP signature term set having approximately 200 signature terms from the previous step resulted in two signature terms—MAIL and RCPT. These two signature terms form the signature term set that is sent to the TTSM algorithm for signature generation.

Construction of TTSM from the example SMTP training set maybe illustrated by considering two example payloads in the SMTP training set below.

| | |
|---|---|
| Payload-1 | EHLO ???? MAIL FROM: <abc@xyz.com>?? RCPT TO: <def@xyz.com>??DATA?? |
| Payload-2 | HELO ???? RCPT ??? MAIL ???? <bbb@pqr.com> ??? |

In the first payload, the term MAIL appears before the term RCPT. Since this is the first payload that the TTSM algorithm scans, there is no state machine that already exists. Hence the TTSM algorithm constructs the state machine as shown in FIG. 3k. Note that the accepting state is state 2. Now, the next step is to process Payload-2 to result in a state machine as shown in FIG. 3m. Note that now there are two accepting states—state 2 and state 4. In these steps, the mutually exclusive term group is not considered in order to generate the state machine. Hence only those terms with the probability greater than the example popularity threshold 0.8 are considered. However, in the case of SMTP, one mutually exclusive term group exists with two terms—HELO and EHLO. These two terms never occur in any payload together, but at least one of them always occurs in SMTP flows. The total probability of this mutually exclusive set is greater the example popularity threshold 0.8. Including these two terms in the signature term set now results in four terms in the set. The TTSM algorithm will consider one payload at a time to generate the final TTSM. The results of two steps (one after processing Payload-1 and the other after processing Payload-2) are shown in FIGS. 3n and 3p. Subsequently, transition probabilities are calculated and assigned to various links in the statement machine of FIG. 3p to complete the TTSM.

As noted above, the method depicted in FIG. 2b uses the TTSM generated based on the method depicted in FIG. 2a to classify a new flow according to transition probabilities in the TTSM. Specifically, the new flow is analyzed to identify all signature terms in the signature term set generated in Step 202 of FIG. 2a above. These signature terms in the new flow forms a sequence of signature terms that is scanned based on the TTSM to classify the new flow.

Initially in Step 211, a pointer is set to point to a dummy term preceding a leading signature term at the very beginning of the sequence of signature terms. In step 212, the start state of the TTSM is set as the active state. In the subsequent steps, the pointer and active state are updated as the TTSM is traversed to sequentially scan the sequence of signature terms identified from the flow under classification.

In step 213, the signature terms are scanned in a portion of the signature term sequence starting from the very signature term pointed to by the pointer. Initially, this portion is the entire signature term sequence because the pointer points to the dummy term. As the method traverses the loop of Steps 213 through 216, this portion is progressively reduced. Each time this portion of the signature term sequence is scanned, search is performed to look for a signature term that matches the signature term assigned to a not-yet-traversed outgoing link from the active state with the highest transition probability.

Continuing the discussion using the example depicted in FIG. 3h, when the first state (i.e., state 0) in the TTSM (302) is the active state and the pointer initially points to the leading signature term $t_2$ of the signature sequence <$t_2$, $t_1$, $t_4$>, the first transition probability 0.67 and the second transition probability 0.33 are compared to generate a comparison result resulting in a decision to perform the search by following the first link $t_1$/0.67 in response to the comparison result indicating that the first transition probability 0.67 exceeds the second transition probability 0.33. In particular, the first consecutive portion starting from the pointer location is <$t_2$, $t_1$, $t_4$> that is searched for the first signature term $t_1$ in response to identifying that the first link is assigned the first signature term $t_1$.

At this point in Step 214, a determination is made as to if the first signature term $t_1$ is found by the search following the first link $t_1$/0.67. If, hypothetically, the answer is that the first signature term $t_1$ is not found, then another determination is made as to if any outgoing link from the active state is not yet traversed. If the answer is no, then the signature term sequence is said to be not matched to the TTSM (302) (Step 217) and the method ends. If the answer is yes, then method returns to Step 213 where the second link $t_2$/0.33, with the next highest transition probability of all outgoing links attached to the active state 0, is traversed to continue the search. In this case, the second link $t_2$/0.33 is identified as assigned the second signature term $t_2$, therefore the search turns to look for the second signature term $t_2$ in the first consecutive portion $<t_2, t_1, t_4>$. Hypothetically in this second round, if the second signature term $t_2$ is not found by traversing the second link $t_2/0.33$ in this manner, a mismatch is determined between the flow under classification and the TTSM (302) in response to determining that no more link remains to be traversed from the active state 0. Said in other words, the second transition probability is less than any other transition probability assigned to any other link associated with the current active state, which is the first state 0.

Returning to the example depicted in FIG. 3h, the first signature term $t_1$ is actually found in Step 214 by searching the first consecutive portion $<t_2, t_1, t_4>$. In response to this finding, in Step 216, the pointer is advanced to point to the matched signature term $t_1$. Said in other words, the first consecutive portion $<t_2, t_1, t_4>$ is adjusted by removing the third signature term $t_2$ to generate a second consecutive portion $<t_1, t_4>$ starting at the now advanced pointer position in the signature term sequence. Further in Step 216, the active state is changed from the first state (i.e., state 0) to the next state of the now traversed first link $t_1/0.67$, which is the second state (i.e., state 1). Generally, the active state is changed to the next state of the last traversed outgoing link assigned with the matched signature term. At this point, a determination is made in Step 218 as to if the active state is determined to be an accepting state, that is, the end of the path in the TTSM (302). If the answer is yes, then a match between the flow under classification and the TTSM (302) is found and the server associated with the flow under classification is determined as executing the network application associated with the signature training set (Step 219). However in this example, the answer is no and the method returns to Step 213 because the second state (i.e., state 1) is not an accepting state and therefore is identified as the active state in the TTSM (302) for continuing analyzing the second consecutive portion $<t_1, t_4>$.

Speed performance of using TTSM to classify a new flow described in reference to FIG. 2b above has been evaluated using three different traces from large ISPs. The first two traces are from tier-1 backbone networks, while the third trace is from a cellular service provider. The first trace is about 10 minutes long, the second trace is about 6 hours long, and the third trace is about 2 hours long. All of the traces are raw packets including the complete packet payload.

Based on the observed speed of using TTSM to classify a new flow described in reference to FIG. 2b above, a portion of the flow under classification can be analyzed based on the TTSM in Step 205 of FIG. 2a to determine that the server as executing the network application prior to the flow under classification is completed by the server. Said in other words, the matching process is performed concurrent with receiving the flow under classification in real time such that the server attached to the flow under classification may be determined, prior to the new flow being completed by the server, to be executing the network application associated with the signature. In particular, the network application executing on the server is undetermined prior to obtaining and analyzing the portion of the flow under classification.

Further, based on the real-time performance in performing Step 205 of FIG. 2a, an alert is generated in Step 206 of FIG. 2a in response to the match if the network application associated with the new flow is previously identified as a malicious application. Accordingly, the flow under classification may be blocked prior to the server completing a task that is being performed using the flow under classification. As an example using today's computer facilities, the flow may last from less than a second to up to a few seconds before the server completes a malicious task.

FIGS. 3a-3g shows an example for determining network application/protocol signatures in NFA format according to aspects of the invention. Specifically, FIGS. 3a-3g depicts an approach to build regular expressions based on the extracted signature terms and represent them in a NFA as network application/protocol signatures.

In an example, consider a flow that has two signature terms $t_1$ and $t_2$. The example order that the signature term $t_1$ occurs subsequent to $t_2$ in the flow can be expressed using the regular expression: $S=(.*)t_2(.*)t_1(.*)$ where $t_1$ and $t_2$ are separate by intervening wildcard substrings (.*). Note that when classifying a newly received flow, once a match is identified for a sequence of signature terms in the NFA, the flow is classified (or labeled) without needing to match any additional signature terms or sequences in flow content. Hence, the above regular expression can be simplified by eliminating the trailing (.*) as follows: $S=(.*)t_2(.*)t_1$.

A regular expression of the above form can be converted to a matching NFA. FIG. 3a shows the NFA corresponding to above regular expression. The NFA has three states (represented as single or double circles enclosing a name of the state) and the transitions (represented as straight arrows) among states are each labeled with an associated signature term (i.e., $t_1, t_2$), when found while sequentially scanning the regular expression, causes the associated transition. State 0 is the start state, state 1 is an intermediate state, and state 2 is an accepting state. An accepting state is represented as a double circle and defined as a possible last state while traversing a NFA (during flow comparison in the classifier). Note that states 0 and 1 have self loops (denoted by "E") corresponding to (.*) in the regular expression.

The NFA can be used to match a sequence of terms that occurs in a flow based on various NFA matching methods, such as (i) backtracking algorithm and (ii) simulating NFA at runtime. For example, the NFA can be simulated at runtime by keeping a set of active states. Initially, the only active state is the start state. As signature terms in the sequence are examined by sequentially scanning the sequence, a new set of active states is created that includes all the states which have an in-coming transition, labeled with the signature term being examined, from any state in the current set of active states. If any of the states in the new set of active states is an accepting state indicating all signature terms in the sequence has been examined, a match is said to be found. That is, the sequence is matched to the NFA and the flow containing the sequence is classified as associated with a server executing a network application having the signature represented by the NFA. Otherwise, this process continues till the complete sequence of signature terms is examined. As is known to those skilled in the art, the self loops are included to allow multiple active states such that multiple branches of an active state can be traversed when a partial match in a path along one branch of the active state may not prevent a complete match in another path along another branch of the active state.

The following is an example illustrating the signature generation and flow classification using NFA. Consider that initially MAIL and RCPT are two signature terms extracted from a flow-set. One of the flows in the flow-set has the following payload 1:

EHLO ??? MAIL FROM <abc@xyz.com>?? RCPT TO: <def@pqr.edu>?? DATA??

Figure 3B:
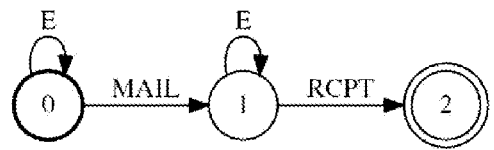

The following regular expression is identified as the application signature from this payload and represented as a corresponding NFA in FIG. 3b.

$$S_1=(.*)MAIL(.*)RCPT$$

Now assuming that at classification stage the following payload 2 is received:

EHLO ??? MAIL FROM <pqr@lmm.edu>?? RCPT TO: <jkl@uvw.com>?? DATA??

This payload contains the sequence of signature terms <MAIL, RCPT>, and the goal is to see if it can be matched to the NFA in FIG. 3b. Table 2 shows the matching process in detail.

TABLE 2

| Sequence Observed | Set of Active State |
|---|---|
| < > | {0} |
| < MAIL > | {0, 1} |
| < MAIL, RCPT > | {0, 1, 2} |

The first column shows the sequence of signature terms that are found when sequentially scanning the payload 2, and the second column represents all the active states in the NFA in FIG. 3b. The first row shows that before any signature terms are found during the sequentially scanning, the only state that is active is state 0. As can be seen in the second row, when sequential scanning finds the term MAIL, both states 0 and 1 become active. Finally when the sequential scanning finds the complete sequence of signature terms as reflected in third row, all the three states in the NFA are active. However, this set of active states contains an accepting state (i.e., state 2) and hence, this payload is said to be matched to the NFA generated from the Payload-1.

Now consider another payload in the classification stage as the following Payload-3.

HELO ???? RCPT ??? MAIL ????<bbb@pqr.com>???}

TABLE 3

| Sequence Observed | Set of Active State |
|---|---|
| < > | {0} |
| < RCPT > | {0} |
| < RCPT, MAIL > | {0,1} |

Table 3 shows the sequence and active states for matching Payload-3 against NFA in FIG. 3b. It can be seen that no accepting state is in the set of active states even after the complete sequence is examined during a sequential scan. This means that Payload-3 is not accepted by the NFA (i.e., matched to the NFA) and therefore, does not match signature $S_1$ above.

Applications typically can operate in several different modes and carry different information. This information is captured in the following example by using payloads from multiple flows to construct a signature. As noted above, a sequence of terms matches the signature if and only if it matches at least one of the several sequences of signature terms in the signature library. In other words, a sequence of terms matches a signature if and only if it is a super-sequence of at least one of the sequence of signature terms in the signature library. A regular expression for two sequences of signature terms can be constructed by first constructing the regular expressions for each signature term sequence and then using the alternation or set union operator (denoted by "|") to combine them. A regular expression containing the alternation operator matches a sequence if the sequence matches either the regular expression before the operator or the regular expression after the operator. For example, two individual regular expressions are extracted from multiple payloads, namely the aforementioned Payload-1 and Payload-3 as below:

$r_1$=(.*)MAIL(.*)RCPT $r_2$=(.*)RCPT(.*)MAIL

Assuming the Payload-1 and Payload-3 belongs to two flows in a cohesive flow-set, combined signature can be generated for the main network application of the flow-set from these two regular expressions as below:

$S_2$=(.*)MAIL(.*)RCPT|(.*)RCPT(.*)MAIL

Figure 3C:
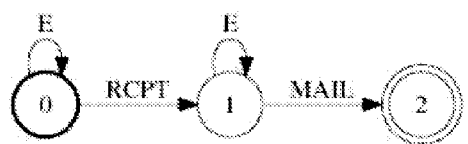
Figure 3D:
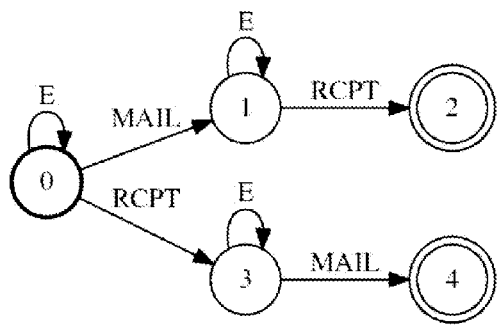

The NFA for the combined signature can be formed by generating the NFA for individual sequences and combining their start states. FIG. 3b and FIG. 3c show the NFA for $r_1$ and $r_2$, respectively. FIG. 3d shows the NFA for the signature $S_2$. Note that the NFA in FIG. 3d now has multiple accepting states. During classification, a match is found as soon as any one of the accepting states is added to the set of active states.

Figure 3E:
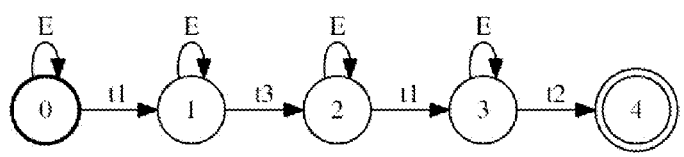

An algorithm for constructing a NFA from a flow-set is described below. First, a method to represent a single flow as a regular expression of signature terms and to construct an NFA from these signature terms is described. A single flow is analyzed first to search for all occurrences of all signature terms. The signature terms that are found in the flow are placed in a sequence according to the order of occurrence in the flow. This sequence of signature terms is converted to a regular expression by preceding each signature term with a wildcard substring (.*). For example, a sequence $<t_1, t_3, t_1, t_2>$ found in a payload is converted to a regular expression (.*) $t_1$(.*) $t_3$(.*) $t_1$(.*) $t_2$. Consider that the number of signature terms in the regular expression is m, which may include repeated signature terms. An equivalent NFA can be created to represent this regular expression by creating a linear sequence of m+1 states. Each of the states except the last one in the linear sequence has a self loop labeled "E'". The last state is an accepting state. The NFA corresponding to the regular expression (.*) $t_1$(.*) $t_3$(.*) $t_1$(.*) $t_2$ is shown in FIG. 3e.

A NFA for all the flows in a flow-set can be constructed by creating a NFA for each flow and then performing a standard union operation over the NFAs. Since all the NFAs that are constructed have similar linear structures with self loops "E" on all internal states, this construction can be used that allows generating a single NFA directly. This NFA shares the states whenever two regular expressions have common prefix. The idea is to have a single NFA at any given time for all flows in a flow-set.

Figure 3F:
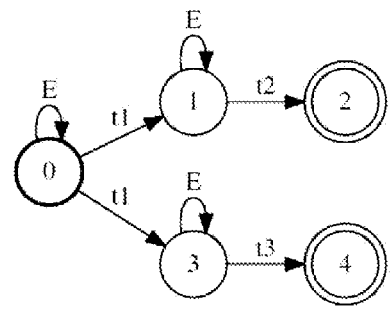
Figure 3G:
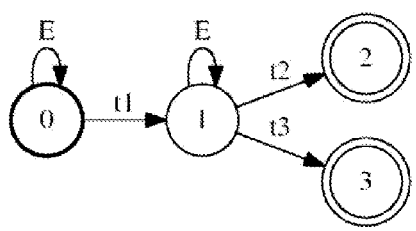
Figure 3H:
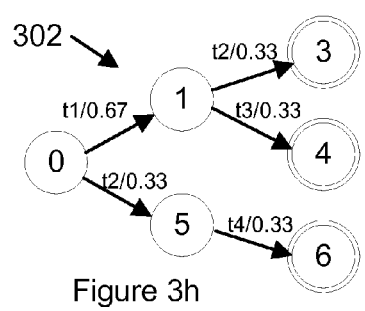
Figure 3I:
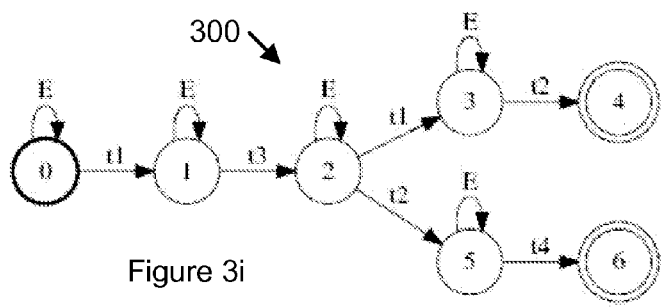
Figure 3J:
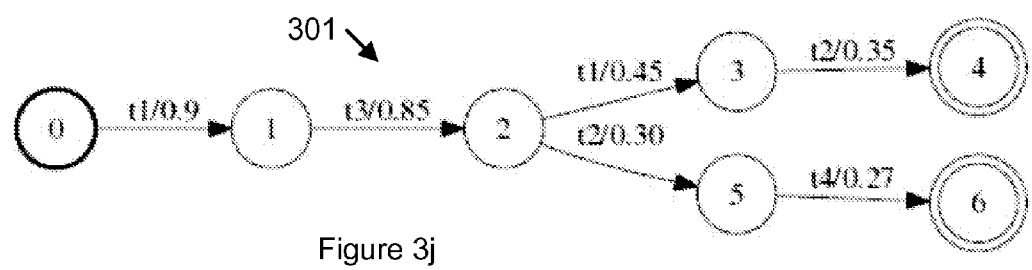
Figure 3K:
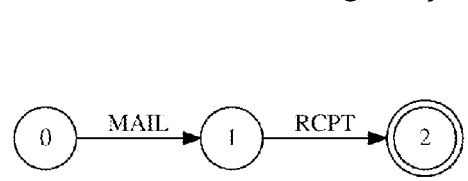
Figure 3M:
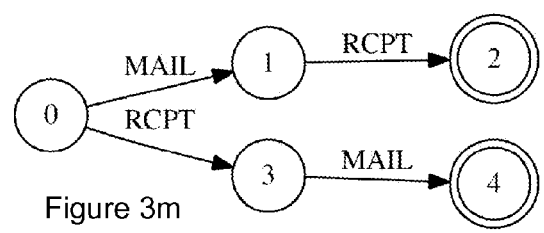
Figure 3N:
Figure 3P:
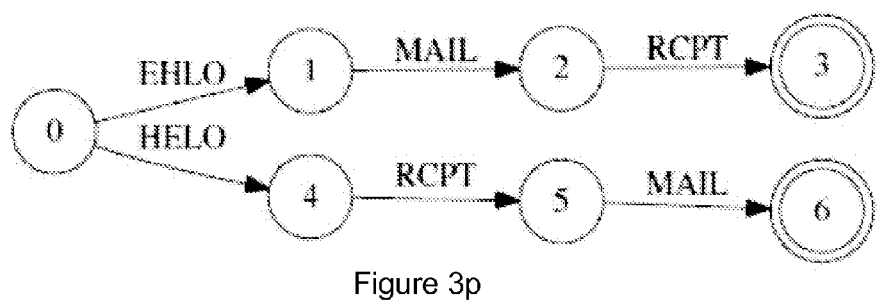

The NFA can be optimized by sharing the states whenever two regular expressions have common prefix. This reduces the number of states in the NFA but does not introduce any new paths in the NFA. This ensures that the matching semantics of the optimized NFA is same as the original NFA. FIG. 3f shows the original NFA generated from the sequences $<t_1, t_2>$ and $<t_2, t_3>$. FIG. 3g shows the optimized NFA with one fewer state than the NFA shown in FIG. 3f. The savings can be significant when generating a signature from large number of flow payloads.

An example algorithm to construct the NFA is shown in TABLE 4 below. The inputs to the algorithm are all the flows in a flow-set (i.e., the set of training flows F) and the set of signature terms (referred to as eligible terms) for the flow-set. First, for every flow in the flow-set, the eligible terms are sorted in the order of occurrence in the payload (line 12). The algorithm iterates through each of these eligible terms in the order of occurrence in the flow payload and builds the state machine starting from state 0 every time (line 10). If the transitions (i.e. the terms) are already part of the state machine, then the pointer to the current state is just forwarded (lines 15). However, if the transition and state do not exist, then they are added to the existing state machine (lines 17-20). If the term that is being examined is the last one in the sorted sequence in the flow payload, then the next state is made into an accepting state (line 22); otherwise a self loop "E" is added as the next state. Finally, after iterating through all the flow content streams from the training flow-set, the final state machine is returned (line 30).

TABLE 4

```
1:    Parameters: F /* Set of training flows */
2:    Parameters: E /* Set of eligible terms */
3:    state_label = 0;
4:    current_state = create_new_state(state_label);
5:    state_label + +;
6:    accepting_states = {};
7:    state_list = {current_state};
8:    state_machine = {};
9:    for f ∈ F do
10:       current_state = 0;
11:       /* Sort terms in terms of the increasing order of the index of the
          term in the flow */
12:       T = sortTerms(f, E);
13:       for t ∈ T do
14:          if hasTransition(current_state, t) then
15:             next_state = get_next_state(current_state, t)
16:          else
17:             next_state = create_new_state(state_label);
18:             state_label + +;
19:             state_list = state_list ∪ {next_state}
20:             state_machine = state_machine ∪ {[current_state, t] →
                 next_state};
21:             if isLastTermInSequence(t) then
22:                accepting_states = accepting_states ∪ {next_state}
23:             else
24:                state_machine = state_machine ∪ {[next_state, Σ] →
                    next_state};
25:             end if
26:          end if
27:          current_state = next_state;
28:       end for
29:    end for
30:    return state_machine;
```

FIGS. 3h-3j shows an example of using network application/protocol signatures by constructing a term transition state machine (TTSM) and scanning a signature term sequence to match the TTSM according to aspects of the invention.

The NFA (300) depicted in FIG. 3i includes states 0 through 6 with state 0 being the starting state and states 4 and 6 being the accepting states. Each of the states is coupled to one or more state transitions each annotated with (or assigned) an associated signature term (i.e., one of $t_1$ through $t_4$), when found while sequentially scanning a string (e.g., a signature term sequence or a regular expression) with the state being active causes the associated state transition in the NFA. For example, while state 0 is the active state, finding the signature term $t_1$ in a flow under classification causes the state transition to occur leading to state 1 becoming active. In another example, while state 2 is the active state, finding the signature term $t_1$ in a flow under classification causes the state transition to occur leading to state 3 becoming active and finding the signature term $t_2$ in a flow under classification causes the state transition to occur leading to state 5 becoming active. The self loops annotated with "E" represent scanning wildcard substrings in the flow under classification. The classification procedure for classifying any flow using the NFA (300) is essentially the same as described with respect to the example NFA depicted in FIG. 3b above.

As described above, the NFA (300) can be converted to the TTSM (301) depicted in FIG. 3j by assigning transition probabilities to state transitions and by eliminating the self loops. In another example, FIG. 3h depicts a TTSM (302) constructed directly from the following three regular expressions $r_1$, $r_2$, and $r_3$ representing three payloads in a training set based on signature terms $t_1$, $t_2$, and $t_3$.

$$r_1 = (.*)t_1(.*)t_2$$

$$r_2 = (.*)t_1(.*)t_3$$

$$r_3 = (.*)t_2(.*)t_4$$

Assuming the three corresponding payloads belongs to a flow-set, a combined signature can be generated for the particular network application of the flow-set from these three regular expressions as below:

$$S_3 = (.*)t_1(.*)t_2|(.*)t_1(.*)t_3|(.*)t_2(.*)t_4$$

Accordingly, the signature $S_3$ is represented by TTSM (302) in classifying other flows with respect to the particular network application. As described above, the signature term sequence $<t_1, t_2>$ represented by the regular expression $r_1$ corresponds to the path <state 0, state 1, state 3> in TTSM (302), the signature term sequence $<t_1, t_3>$ represented by the regular expression $r_2$ corresponds to the path <state 0, state 1, state 4> in TTSM (302), and the signature term sequence $<t_2, t_4>$ represented by the regular expression $r_3$ corresponds to the path <state 0, state 5, state 6> in TTSM (302). Further, the state transition from state 0 to state 1 corresponds to the signature term transition $(.*) \Rightarrow t_1$ occurring twice in the training set (i.e., once in each of $r_1$ and $r_2$), the state transition from state 1 to state 3 corresponds to the signature term transition $t_1 \Rightarrow (.*) \Rightarrow t_2$ occurring once in the training set (i.e., $r_1$), the state transition from state 1 to state 4 corresponds to the signature term transition $t_1 \Rightarrow (.*) \Rightarrow t_3$ occurring once in the training set (i.e., $r_2$), the state transition from state 0 to state 5 corresponds to the signature term transition $(.*) \Rightarrow t_2$ occurring once in the training set (i.e., $r_3$), and the state transition from state 5 to state 6 corresponds to the signature term transition $t_2 \Rightarrow (*) \Rightarrow t_4$ occurring once in the training set (i.e., $r_3$). Accordingly, the transition probabilities are calculated as 0.67 (i.e., two corresponding signature transitions in the training set divided by three payloads in the training set) for the state transition from state 0 to state 1 and 0.33 for all other state transitions. Note that a signature term transition (e.g., $t_1 \Rightarrow (.*) \Rightarrow t_2$) generally includes two signature terms (e.g., $t_1$, $t_2$) except in a "degenerated" signature term transition (e.g., $(.*) \Rightarrow t_1$) that transitions to a leading signature term (e.g., $t_1$) in a regular expression (e.g., $r_1$).

In the TTSM (301) depicted in FIG. 3j, the classification procedure of NFA (300) is modified so that only one active state is maintained at any moment. Also, a different approach may be used for matching TTSM to signature terms in the flow to be classified. First, the sequence of signature terms is extracted from the flow to be classified. Matching starts from the start state 0 in the TTSM (301) by maintaining a pointer to the current signature term being examined in the sequence. The current signature term being examined is initially set to a dummy term before the first signature term in the sequence is examined. Each state has the list of outgoing state transitions sorted by decreasing transition probabilities if more than one outgoing state transition exists. At each state, the sequence of signature terms is examined starting from current pointer to see if the signature term annotating the outgoing state transition with the highest transition probability can be found. If such signature term is not found, the other signature term annotating the state transition with the next highest term transition probability is searched. This search continues until a match is found. In which case, the current pointer is advanced in the sequence to the matched signature term while the next state on state transition annotated by the matched signature term is designated as the active state. If an accepting state becomes active then a classification is found and the search stops. Although not explicitly discussed in this disclosure, it is contemplated that a confidence score may be generated based on the path traversed, such that the decision to stop traversing the TTSM is based on the confidence score meeting certain pre-determined threshold.

An example TTSM classification scheme using the example TTSM (301) depicted in FIG. 3j and the signature term sequence $<t_3, t_1, t_3, t_2, t_1, t_2, t_4>$ extracted from a flow being classified is described below. Initially, the active state is state 0, and current pointer is set before the first term $t_3$. When in state 0, by default since only one outgoing state transition exists, the highest transition probability occurs with the state transition annotated with the signature term $t_1$. A TTSM based classifier (e.g., classifier (103) of FIG. 1) searches through the sequence of signature terms starting from the current pointer to the end of the sequence to see if it finds the signature term $t_1$. In this case, the signature term $t_1$ occurs as the second term in the sequence. The TTSM based classifier moves the current pointer to the second signature term $t_1$ in the sequence, and makes state 1 active. Note that the first term $t_3$ is skipped and not considered, which is in contrast to NFA based matching.

In state 1, the TTSM based classifier moves the current pointer to the third signature term $t_3$ in the sequence, and makes state 2 the only active state, again in contrast to NFA based matching. As noted above, eliminating self loops may cause certain flows to be not classified (i.e., false negative) due to a partial match found when traversing along one branch of the last active state preventing a potential complete match being found if another branch of the last active state is allowed to be traversed. However, in the system (100) described above, flows not classified due to false negative are returned to the signature generation process to generate another signature that can be used to detect another flow containing the signature term sequence previously escaped the classification.

In state 2, the TTSM based classifier looks at all the signature terms in the sequence starting from the current pointer (i.e., it looks at $t_2, t_1, t_2$, and $t_4$) and determines that, from state 2, $t_1$-annotated outgoing state transition has a higher transition probability 0.45 than the transition probability 0.30 of the $t_2$-annotated outgoing state transition. Accordingly, the TTSM based classifier considers the $t_1$-annotated outgoing state transition and moves current pointer to the third signature term $t_1$ in the sequence, and makes state 3 the only active state.

In state 3, the TTSM based classifier moves current pointer to the sixth signature term $t_2$ in the sequence, and make state 4 the only active state.

Since state 4 is an accepting state, the matching is complete and the classification is done. That is, the signature term sequence $<t_3, t_1, t_3, t_2, t_1, t_2, t_4>$ is matched to the TTSM (301) and the signature represented by the TTSM (301). Accordingly, the flow is classified as associated with the network application having the signature represented by the TTSM (301).

As described above, the TTSM based classifier does not introduce or remove any states from the corresponding NFA, but just adding a constraint in terms of when a state transition is or is not to be considered based on the state transition probability comparison if multiple outgoing state transitions exist for an active state. Therefore, the set of flows that can be classified by the TTSM based classifier is a subset of the set of term sequences that can be classified by using the corresponding NFA. For example, the TTSM based classifier may not classify certain flows (e.g., due to skipping the first term $t_3$ in the aforementioned signature term sequence) using TTSM (301) that are classifiable by using the corresponding NFA (300). In contrast, any flow that is not classified using the NFA (300) will also not be classified using the TTSM (301). As discussed with respect to the system (100) of FIG. 1 above, this is acceptable as any flow that is not classified will be fed back to the signature generation process.

An example of a flow that can be classified by NFA based matching but fails to be classified by TTSM based matching is illustrated using the TTSM (302) depicted in FIG. 3h and the signature term sequence $<t_2, t_1, t_4>$ extracted from a flow under classification. Initially, the active state is state 0, and current pointer is set pointing to the first term $t_2$. When in state 0, the TTSM based classifier looks at all the signature terms in the sequence starting from the current pointer (i.e., it looks at $t_2, t_1$, and $t_4$) and determines that, from state 0, $t_1$-annotated outgoing state transition has a higher transition probability 0.67 than the transition probability 0.33 of the $t_2$-annotated outgoing state transition. Accordingly, the TTSM based classifier considers the $t_1$-annotated outgoing state transition and moves current pointer to the second signature term $t_1$ in the sequence, and makes state 1 the only active state. Note that the first term $t_2$ is skipped and not considered, which is in contrast to NFA based matching.

In state 1, the TTSM based classifier looks at all the signature terms in the sequence starting from the current pointer (i.e., it looks at $t_4$) and determines that, from state 1, none of the $t_2$-annotated outgoing state transition and the $t_3$-annotated outgoing state transition can be traversed (i.e., followed) because $t_2$ and $t_3$ are not in the remaining sequence of ($t_1$ and $t_4$). Accordingly, the TTSM based classifier fails to match the signature term sequence $<t_2, t_1, t_4>$ to the TTSM (302) even though the signature term sequence $<t_2, t_1, t_4>$ contains the third element of the signature $S_3$ and can be matched to a corresponding NFA. As noted above, the flow containing the signature term sequence $<t_2, t_1, t_4>$ is fed back to the signature generation process to generate another signature that is capable to detect another flow containing the $<t_2, t_1, t_4>$ sequence previously escaped the classification.

Although specific formats or structures are used as examples in the foregoing description regarding the flows, the captured payloads, the signature terms, the NFA, the TTSM, etc., one skilled in the art, with the benefit of this disclosure, will recognize that other formats or structures may also be used in the system and methods described without deviating from the spirit of the invention.

Figure 4:
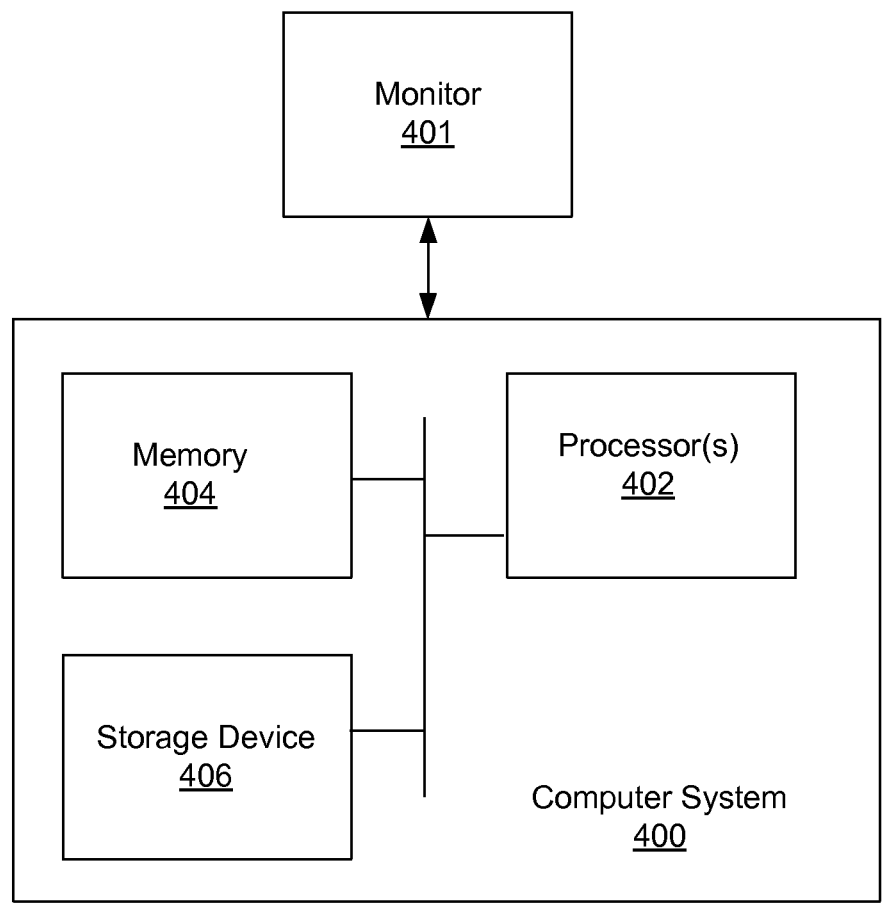
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (not shown), a mouse (not shown), or a microphone (not shown). Further, the computer (400) may include output means, such as a monitor (401) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for profiling network traffic of a network, comprising:
    identifying, using a processor of a computer system and based on a pre-determined criterion, a training set from a plurality of flows obtained from the network traffic, wherein the training set is associated with a network application and comprises a plurality of captured payloads corresponding to the plurality of flows;
    determining, using the processor and based on a first pre-determined algorithm, a set of signature terms from the training set, wherein the set of signature terms are selected from a plurality of substrings extracted from the plurality of captured payloads;
    representing a portion of the plurality of captured payloads as a plurality of regular expressions, each comprising a first sequence of one or more signature terms based on the set of signature terms;
    representing a first regular expression of the plurality of regular expressions as a first path of a plurality of paths in a term transition state machine (TTSM), the TTSM comprising a plurality of states coupled by a plurality of links comprising a first link, coupling first and second states of the plurality of states to form a portion of the first path, that is assigned a first signature term and a first transition probability, the first transition probability corresponding to a first signature term transition, transitioning to the first signature term, in the first regular expression; and
    analyzing, using the processor and based on the TTSM according to at least the first transition probability, a flow separate from the plurality of flows and associated with a server in the network to determine the server as executing the network application.

2. The method of claim 1, wherein the network application comprises a layer-seven application.

3. The method of claim 1, further comprising:
    representing the plurality of regular expressions as a non-deterministic finite automaton (NFA) comprising the plurality of states coupled by the plurality of links, wherein the state transitions comprise a self loop transition from a state of the plurality of states back to the state itself; and
    converting the NFA to the TTSM at least by:
        tallying occurrence of the first signature term transition in the plurality of regular expressions to generate a count;
        calculating the first transition probability, based on the count, to assign to the first link in the NFA; and
        eliminating the self loop transition.

4. The method of claim 3, further comprising:
    dividing the count over a total number of captured payloads in the training set to calculate the first transition probability.

5. The method of claim 1, further comprising:
    representing a second regular expression of the plurality of regular expressions as a second path of the plurality of paths,
    wherein the plurality of links further comprises a second link, coupling the first state and a third state of the plurality of states to form a portion of the second path, that is assigned a second signature term and a second transition probability, the second transition probability corresponding to a second signature term transition, transitioning to the second signature term, in the second regular expression, and
    wherein analyzing the flow based on the TTSM comprises:
        comparing the first transition probability and the second transition probability to generate a comparison result; and
        traversing the first link in response to the comparison result indicating that the first transition probability exceeds the second transition probability.

6. The method of claim 5, wherein analyzing the flow based on the TTSM further comprises:
    extracting, from the flow and based on a second pre-determined algorithm, a second sequence of signature terms based on the set of signature terms; and
    identifying, for analysis based on the TTSM, a first consecutive portion of the second sequence of signature terms starting from a third signature term in the second sequence of signature terms;
    identifying the first state as a first active state in the TTSM for analyzing the first consecutive portion,
    wherein traversing the first link comprises:
        searching the first consecutive portion for the first signature term in response to identifying that the first link is assigned the first signature term.

7. The method of claim 6, wherein traversing the first link further comprises:
    in response to finding the first signature term by searching the first consecutive portion:
        adjusting the first consecutive portion to generate a second consecutive portion of the second sequence of signature terms by removing the third signature term from the first consecutive portion; and identifying the second state as a second active state in the TTSM for analyzing the second consecutive portion.

8. The method of claim 6, wherein traversing the first link further comprises:
in response to finding the first signature term by searching the first consecutive portion, determining a match between the flow and the TTSM in response to determining the second state as being end of the first path; and
determining, in response to the match, the server as executing the network application.

9. The method of claim 6, wherein analyzing the flow based on the TTSM further comprises:
traversing the second link in response to the first signature term not being found by traversing the first link,
wherein traversing the second link comprises:
searching the current consecutive portion for the second signature term in response to identifying that the second link is assigned the second signature term.

10. The method of claim 9, wherein traversing the second link further comprises:
in response to the second signature term not being found by traversing the second link, determining a mismatch between the flow and the TTSM in response to determining that the second transition probability is less than any other transition probability assigned to any other link associated with the first state.

11. The method of claim 1, further comprising:
generating the TTSM during a training phase to represent the plurality of regular expressions, wherein the plurality of flows are obtained from the network traffic during the training phase, wherein the set of signature terms are compiled during the training phase;
obtaining a portion of the flow subsequent to the training phase; and
analyzing the portion of the flow based on the TTSM to determine, prior to the flow being completed by the server, the server as executing the network application,
wherein the server is not determined, prior to obtaining the portion of the flow, as executing the network application.

12. A system for profiling network traffic of a network, comprising:
a data collector configured to obtain, from the network traffic, a plurality of flows;
a statistical analyzer configured to identify, from the plurality of flows, a training set comprising a plurality of captured payloads corresponding to the plurality of flows;
a profiler configured to identify the training set as associated with a network application;
a signature generator configured to:
determine, based on a first pre-determined algorithm, a set of signature terms from the training set, wherein the set of signature terms are selected from a plurality of substrings extracted from the plurality of captured payloads;
represent a portion of the plurality of captured payloads as a plurality of regular expressions, each comprising a first sequence of one or more signature terms based on the set of signature terms; and
represent a first regular expression of the plurality of regular expressions as a first path of a plurality of paths in a term transition state machine (TTSM), the TTSM comprising a plurality of states coupled by a plurality of links comprising a first link, coupling first and second states of the plurality of states to form a portion of the first path, that is assigned a first signature term and a first transition probability, the first transition probability corresponding to a first signature term transition, transitioning to the first signature term, in the first regular expression;
a processor and memory storing instructions when executed by the processor comprising functionalities to analyze, based on the TTSM according to at least the first transition probability, a flow separate from the plurality of flows and associated with a server in the network to determine the server as executing the network application; and
a repository configured to store the set of signature terms and the TTSM.

13. The system of claim 12,
wherein the network application comprises a layer-seven application.

14. The system of claim 12, the signature generator further configured to:
represent the plurality of regular expressions as a nondeterministic finite automaton (NFA) comprising the plurality of states coupled by the plurality of links, wherein the state transitions comprise a self loop transition from a state of the plurality of states back to the state itself; and
convert the NFA to the TTSM at least by:
tallying occurrence of the first signature term transition in the plurality of regular expressions to generate a count;
calculating the first transition probability, based on the count, to assign to the first link in the NFA; and
eliminating the self loop transition.

15. The system of claim 14, the signature generator further configured to:
divide the count over a total number of captured payloads in the training set to calculate the first transition probability.

16. The system of claim 12, the signature generator further configured to:
represent a second regular expression of the plurality of regular expressions as a second path of the plurality of paths,
wherein the plurality of links further comprises a second link, coupling the first state and a third state of the plurality of states to form a portion of the second path, that is assigned a third signature term and a second transition probability, the second transition probability corresponding to a second signature term transition, transitioning to the second signature term, in the second regular expression, and
wherein analyzing the flow based on the TTSM comprises:
comparing the first transition probability and the second transition probability to generate a comparison result; and
traversing the first link in response to the comparison result indicating that the first transition probability exceeds the second transition probability.

17. The system of claim 16, wherein analyzing the flow based on the TTSM further comprises:
extracting, from the flow and based on a second pre-determined algorithm, a second sequence of signature terms based on the set of signature terms; and
identifying, for analysis based on the TTSM, a first consecutive portion of the second sequence of signature terms starting from a third signature term in the second sequence of signature terms;
identifying the first state as a first active state in the TTSM for analyzing the first consecutive portion, wherein traversing the first link comprises:
searching the first consecutive portion for the first signature term in response to identifying that the first link is assigned the first signature term.

18. The system of claim 17, wherein traversing the first link further comprises:
in response to finding the first signature term by searching the first consecutive portion:
adjusting the first consecutive portion to generate a second consecutive portion of the second sequence of signature terms by removing the third signature term from the first consecutive portion; and
identifying the second state as a second active state in the TTSM for analyzing the second consecutive portion.

19. The system of claim 17, wherein traversing the first link further comprises:
in response to finding the first signature term by searching the first consecutive portion, determining a match between the flow and the TTSM in response to determining the second state as being end of the first path; and
determining, in response to the match, the server as executing the network application.

20. The system of claim 17, wherein analyzing the flow based on the TTSM further comprises:
traversing the second link in response to the first signature term not being found by traversing the first link,
wherein traversing the second link comprises:
searching the current consecutive portion for the second signature term in response to identifying that the second link is assigned the second signature term.

21. The system of claim 20, wherein traversing the second link further comprises:
in response to the second signature term not being found by traversing the second link, determining a mismatch between the flow and the TTSM in response to determining that the second transition probability is less than any other transition probability assigned to any other link associated with the first state.

22. The system of claim 12, the signature generator further configured to:
generate the TTSM during a training phase to represent the plurality of regular expressions, wherein the plurality of flows are obtained from the network traffic during the training phase, wherein the set of signature terms are compiled during the training phase;
obtain a portion of the flow subsequent to the training phase; and
analyze the portion of the flow based on the TTSM to determine, prior to the flow being completed by the server, the server as executing the network application, wherein the server is not determined, prior to obtaining the portion of the flow, as executing the network application.

23. A non-transitory computer readable medium embodying instructions for profiling network traffic of a network, the instructions when executed by a processor comprising functionality for:
identifying, based on a pre-determined criterion, a training set from a plurality of flows obtained from the network traffic, wherein the training set is associated with a network application and comprises a plurality of captured payloads corresponding to the plurality of flows;
determining, based on a first pre-determined algorithm, a set of signature terms from the training set, wherein the set of signature terms are selected from a plurality of substrings extracted from the plurality of captured payloads;
representing a portion of the plurality of captured payloads as a plurality of regular expressions, each comprising a first sequence of one or more signature terms based on the set of signature terms;
representing a first regular expression of the plurality of regular expressions as a first path of a plurality of paths in a term transition state machine (TTSM), the TTSM comprising a plurality of states coupled by a plurality of links comprising a first link, coupling first and second states of the plurality of states to form a portion of the first path, that is assigned a first signature term and a first transition probability, the first transition probability corresponding to a first signature term transition, transitioning to the first signature term, in the first regular expression; and
analyzing, based on the TTSM according to at least the first transition probability, a flow separate from the plurality of flows and associated with a server in the network to determine the server as executing the network application.

24. The non-transitory computer readable medium of claim 23, wherein the network application comprises a layer-seven application.

25. The non-transitory computer readable medium of claim 23, the instructions when executed by the processor further comprising functionality for:
representing the plurality of regular expressions as a non-deterministic finite automaton (NFA) comprising the plurality of states coupled by the plurality of links, wherein the state transitions comprise a self loop transition from a state of the plurality of states back to the state itself; and
converting the NFA to the TTSM at least by:
tallying occurrence of the first signature term transition in the plurality of regular expressions to generate a count;
calculating the first transition probability, based on the count, to assign to the first link in the NFA; and
eliminating the self loop transition.

26. The non-transitory computer readable medium of claim 25, the instructions when executed by the processor further comprising functionality for:
dividing the count over a total number of captured payloads in the training set to calculate the first transition probability.

27. The non-transitory computer readable medium of claim 23, the instructions when executed by the processor further comprising functionality for:
representing a second regular expression of the plurality of regular expressions as a second path of the plurality of paths,
wherein the plurality of links further comprises a second link, coupling the first state and a third state of the plurality of states to form a portion of the second path, that is assigned a third signature term and a second transition probability, the second transition probability corresponding to a second signature term transition, transitioning to the second signature term, in the second regular expression, and
wherein analyzing the flow based on the TTSM comprises:
comparing the first transition probability and the second transition probability to generate a comparison result; and
traversing the first link in response to the comparison result indicating that the first transition probability exceeds the second transition probability.

28. The non-transitory computer readable medium of claim 27, wherein analyzing the flow based on the TTSM further comprises:
- extracting, from the flow and based on a second pre-determined algorithm, a second sequence of signature terms based on the set of signature terms; and
- identifying, for analysis based on the TTSM, a first consecutive portion of the second sequence of signature terms starting from a third signature term in the second sequence of signature terms;
- identifying the first state as a first active state in the TTSM for analyzing the first consecutive portion,
- wherein traversing the first link comprises:
  - searching the first consecutive portion for the first signature term in response to identifying that the first link is assigned the first signature term.

29. The non-transitory computer readable medium of claim 28, wherein traversing the first link further comprises:
- in response to finding the first signature term by searching the first consecutive portion:
  - adjusting the first consecutive portion to generate a second consecutive portion of the second sequence of signature terms by removing the third signature term from the first consecutive portion; and
  - identifying the second state as a second active state in the TTSM for analyzing the second consecutive portion.

30. The non-transitory computer readable medium of claim 28, wherein traversing the first link further comprises:
- in response to finding the first signature term by searching the first consecutive portion, determining a match between the flow and the TTSM in response to determining the second state as being end of the first path; and
- determining, in response to the match, the server as executing the network application.

31. The non-transitory computer readable medium of claim 28, wherein analyzing the flow based on the TTSM further comprises:
- traversing the second link in response to the first signature term not being found by traversing the first link,
- wherein traversing the second link comprises:
  - searching the current consecutive portion for the second signature term in response to identifying that the second link is assigned the second signature term.

32. The non-transitory computer readable medium of claim 31, wherein traversing the second link further comprises:
- in response to the second signature term not being found by traversing the second link, determining a mismatch between the flow and the TTSM in response to determining that the second transition probability is less than any other transition probability assigned to any other link associated with the first state.

33. The non-transitory computer readable medium of claim 23, the instructions when executed by the processor further comprising functionality for:
- generating the TTSM during a training phase to represent the plurality of regular expressions, wherein the plurality of flows are obtained from the network traffic during the training phase, wherein the set of signature terms are compiled during the training phase;
- obtaining a portion of the flow subsequent to the training phase; and
- analyzing the portion of the flow based on the TTSM to determine, prior to the flow being completed by the server, the server as executing the network application,
- wherein the server is not determined, prior to obtaining the portion of the flow, as executing the network application.

* * * * *